(12) United States Patent
Doostnejad et al.

(10) Patent No.: US 10,122,434 B2
(45) Date of Patent: Nov. 6, 2018

(54) APPARATUS, SYSTEM AND METHOD OF HYBRID BEAMFORMING TRAINING

(71) Applicant: INTEL CORPORATION, Santa Clara, CA (US)

(72) Inventors: Roya Doostnejad, Los Altos, CA (US); Hosein Nikopour, San Jose, CA (US); Wook Bong Lee, Pleasanton, CA (US)

(73) Assignee: INTEL CORPORATION, Santa Clara, CA (US)

( * ) Notice: Subject to any disclaimer, the term of this patent is extended or adjusted under 35 U.S.C. 154(b) by 149 days.

(21) Appl. No.: 15/199,671

(22) Filed: Jun. 30, 2016

(65) Prior Publication Data

US 2018/0006702 A1   Jan. 4, 2018

(51) Int. Cl.
| H04B 7/06 | (2006.01) |
| H04L 5/00 | (2006.01) |
| H04B 7/0452 | (2017.01) |
| H04B 7/0408 | (2017.01) |
| H04L 27/26 | (2006.01) |

(52) U.S. Cl.
CPC ......... *H04B 7/0639* (2013.01); *H04B 7/0408* (2013.01); *H04B 7/0452* (2013.01); *H04B 7/0617* (2013.01); *H04L 5/0048* (2013.01); *H04L 27/2613* (2013.01); *H04J 2211/008* (2013.01); *H04L 27/2602* (2013.01); *H04L 27/2643* (2013.01)

(58) Field of Classification Search
None
See application file for complete search history.

(56) References Cited

U.S. PATENT DOCUMENTS

| 2005/0085267 A1* | 4/2005 | Lemson ................ H04B 7/10 455/562.1 |
| 2012/0033761 A1* | 2/2012 | Guo .................... G01S 3/023 375/316 |
| 2015/0097739 A1* | 4/2015 | Samuel ................ H01Q 1/246 343/702 |
| 2016/0142922 A1* | 5/2016 | Chen .................. H04B 7/0695 375/267 |
| 2016/0233932 A1* | 8/2016 | Hedayat ............. H04B 7/0421 |
| 2016/0337016 A1* | 11/2016 | Capar ................ H04B 7/0456 |
| 2017/0111894 A1* | 4/2017 | Chen .................. H04L 5/0007 |

(Continued)

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Donald Mills
(74) *Attorney, Agent, or Firm* — Shichrur & Co.

(57) ABSTRACT

For example, a first wireless station may be configured to perform hybrid beamforming training including simultaneously communicating a first plurality of spatially multiplexed Synchronization Signals (SS) beamformed in a plurality of wide beam directions; and simultaneously communicating a second plurality of spatially multiplexed SS beamformed in a plurality of narrow beam directions, which correspond to one or more reported wide beam directions.

24 Claims, 9 Drawing Sheets

(56) References Cited

U.S. PATENT DOCUMENTS

| | | | | |
|---|---|---|---|---|
| 2017/0134079 A1* | 5/2017 | Kim | ...................... | H04B 7/0456 |
| 2017/0134083 A1* | 5/2017 | Kim | ...................... | H04B 7/0617 |
| 2017/0272132 A1* | 9/2017 | Tsai | ...................... | H04B 7/0408 |
| 2017/0272223 A1* | 9/2017 | Kim | ...................... | H04L 5/0048 |
| 2017/0273063 A1* | 9/2017 | Kim | ...................... | H04W 72/046 |
| 2017/0279503 A1* | 9/2017 | Tomeba | ............... | H04B 7/0417 |
| 2018/0006696 A1* | 1/2018 | Yue | ...................... | H04B 7/0421 |

OTHER PUBLICATIONS

IEEE Std 802.11ad™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

Liang Zhou et al., Efficient Codebook-Based MIMO Beamforming for Millimeter-Wave WLAN's, IEEE 23rd International Symposium on Personal, Indoor and Mobile Radio Communications, 2012, pp. 1885-1889.

Ahmed Aikhateeb et al, Channel Estimation and Hybrid Precoding for Millimeter Wave Cellular Systems, IEEE Journal of Selected Topics in Signal Processing, vol. 8, No. 5, Oct. 2014, pp. 831-846.

Tobias Franks et al, IFDMA—A Promising Multiple Access Scheme for Future Mobile Radio Systems, IEEE 16th International Symposium on Personal, Indoor and Mobile Radio Communications, 2005, pp. 1214-1218.

C. Nicolas Barati et al, Directional Cell Discovery in Millimeter Wave Cellular Networks, IEEE Transactions on Wireless Communications, vol. 14, No. 12, Dec. 2015, pp. 6664-6678.

* cited by examiner

APPARATUS, SYSTEM AND METHOD OF HYBRID BEAMFORMING TRAINING

TECHNICAL FIELD

Embodiments described herein generally relate to hybrid beamforming training.

BACKGROUND

A wireless communication network in a millimeter-wave (mmWave) band may provide high-speed data access for users of wireless communication devices.

In order to perform communication over the mmWave band, highly directional transmissions may be essential, e.g., even for initial beam acquisition.

A beamforming procedure may be configured to steer a first directional antenna of a first wireless communication device, e.g., a beamforming initiator (BI), and a second directional antenna of a second wireless communication device, e.g., a beamforming responder (BR). The beamforming procedure may be performed, for example, to establish a high throughout communication link between the BI and the BR, e.g., at an acceptable communication range between the BR and the BI.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
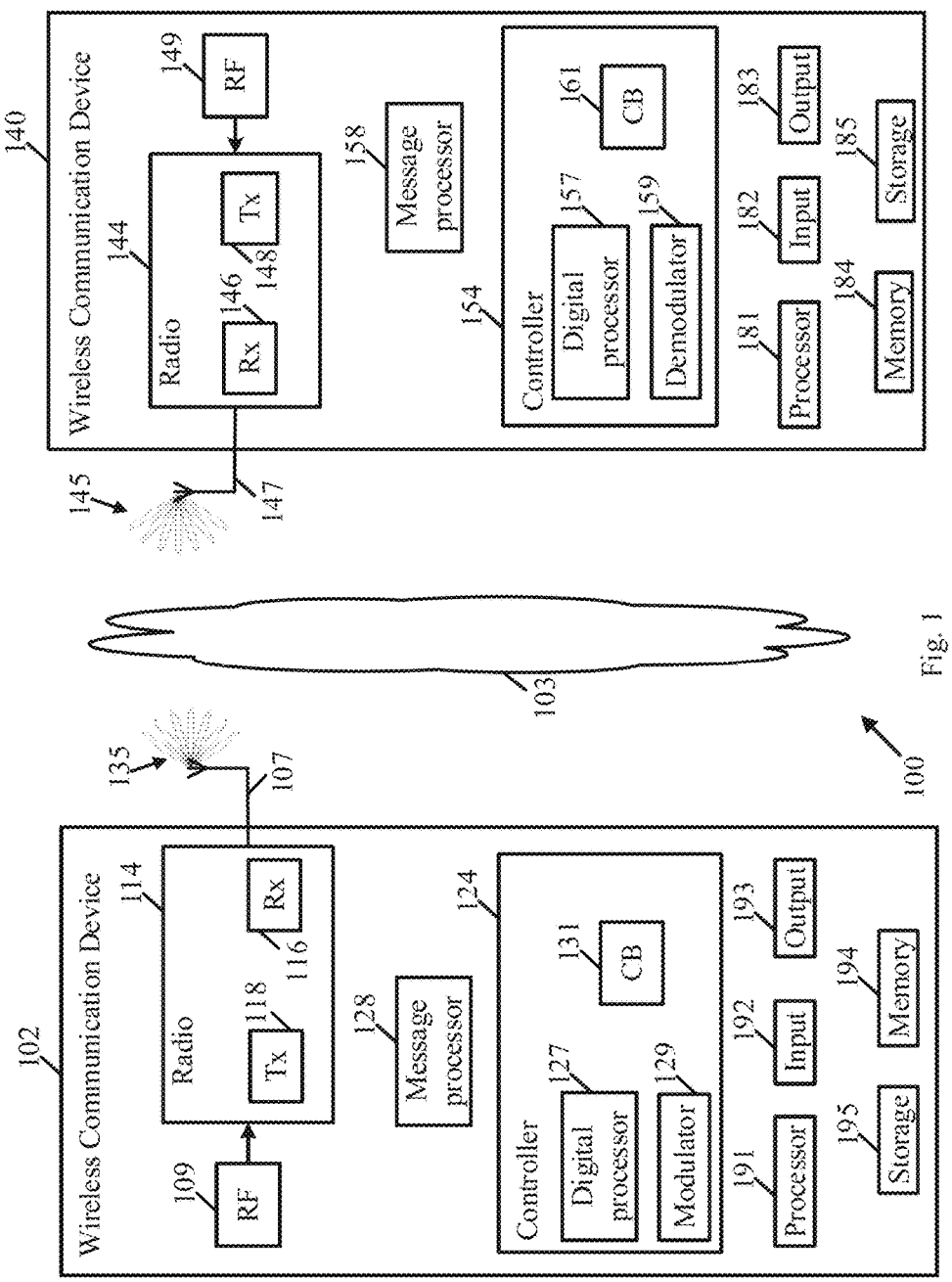
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2012, IEEE Standard for Information technology—Telecommunications and information exchange between systems Local and metropolitan area networks—Specific requirements—Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60GHz Band", 28 December, 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.1 lay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)) and/or future versions and/or derivatives thereof, devices and/or networks operating in accordance with existing WiFi Alliance (WFA) Peer-to-Peer (P2P) specifications (including WiFi P2P technical specification, version 1.5, Aug. 4, 2015) and/or future versions and/or derivatives thereof, devices and/or networks operating in accordance with existing Wireless-Gigabit-Alliance (WGA) specifications (including Wireless Gigabit Alliance, Inc WiGig MAC and PHY Specification Version 1.1, April 2011, Final specification) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a Wi-Fi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a Quality of Service (QoS) basic service set (BSS), a tunneled direct-link setup (TDLS) link, a STA-to-STA communication in an independent basic service set (IBSS), or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., at least 7 Gigabit per second, at least 30 Gigabit per second, or any other rate.

Some demonstrative embodiments may be implemented by a DMG STA (also referred to as a "millimeter-wave (mmWave) STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, and/or one more other devices.

In some demonstrative embodiments, wireless communication devices 102 and/or 140 may include a mobile device or a non-mobile, e.g., a static, device.

For example, wireless communication devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a sensor device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a Wireless Fidelity (WiFi) channel, an IR channel, a Bluetooth (BT) channel, a Global Navigation Satellite System (GNSS) Channel, and the like.

In some demonstrative embodiments, WM 103 may include a directional channel in a directional frequency band. For example, WM 103 may include a millimeter-wave (mmWave) wireless communication channel.

In some demonstrative embodiments, WM 103 may include a DMG channel. In other embodiments, WM 103 may include any other additional or alternative directional channel.

In other embodiments, WM 103 may include any other type of channel over any other frequency band.

In some demonstrative embodiments, devices 102 and/or 140 may perform the functionality of one or more wireless stations (STA), e.g., as described below.

In some demonstrative embodiments, devices 102 and/or 140 may perform the functionality of one or more DMG stations.

In other embodiments, devices 102 and/or 140 may perform the functionality of any other wireless device and/or station, e.g., a WLAN STA, a Wi-Fi STA, a UE, a cellular communication device, and the like.

In some demonstrative embodiments, devices 102 and/or 140 may be configured to perform the functionality of an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, devices 102 and/or 140 may be configured to perform the functionality of a non-AP STA, e.g., a DMG non-AP STA, and/or a non-PCP STA, e.g., a DMG non-PCP STA, for example, a non-AP/PCP STA, e.g., a DMG non-AP/PCP STA.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments, devices 102 and/or 140 may include one or more radios including circuitry and/or logic to perform wireless communication between devices 102, 140 and/or one or more other wireless communication devices. For example, device 102 may include a radio 114, and/or device 140 may include a radio 144.

In some demonstrative embodiments, radio 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio

144 may include or may be implemented as part of a wireless Network Interface Card (NIC), and the like.

In some demonstrative embodiments, radios 114 and/or 144 may be configured to communicate over a directional band, for example, an mmWave band, and/or any other band, for example, a 2.4 GHz band, a 5 GHz band, a S1G band, and/or any other band.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, radios 114 and/or 144 may include, or may be associated with, a plurality of directional antennas.

In some demonstrative embodiments, device 102 may include one or more, e.g., a plurality of, directional antennas 107, and/or device 140 may include on or more, e.g., a plurality of, directional antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include directional antennas, which may be steered to one or more beam directions. For example, antennas 107 may be steered to one or more beam directions 135, and/or antennas 147 may be steered to one or more beam directions 145.

In some demonstrative embodiments, antennas 107 and/or 147 may include and/or may be implemented as part of a single Phased Antenna Array (PAA).

In some demonstrative embodiments, antennas 107 and/or 147 may be implemented as part of a plurality of PAAs, for example, as a plurality of physically independent PAAs.

In some demonstrative embodiments, a PAA may include, for example, a rectangular geometry, e.g., including an integer number, denoted M, of rows, and an integer number, denoted N, of columns. In other embodiments, any other types of antennas and/or antenna arrays may be used.

In some demonstrative embodiments, antennas 107 and/or antennas 147 may be connected to, and/or associated with, one or more Radio Frequency (RF) chains.

In some demonstrative embodiments, device 102 may include one or more, e.g., a plurality of, RF chains 109 connected to, and/or associated with, antennas 107.

In some demonstrative embodiments, device 140 may include one or more, e.g., a plurality of, RF chains 149 connected to, and/or associated with, antennas 147.

In some demonstrative embodiments devices 102 and/or 140 may be configured to communicate over a Next Generation 60 GHz (NG60) network, an Extended DMG (EDMG) network, and/or any other network. For example, devices 102 and/or 140 may perform Multi-In-Multi-Out (MIMO) communication, for example, for communicating over the NG60 and/or EDMG networks, e.g., over an NG60 or an EDMG frequency band.

Some demonstrative embodiments may be implemented, for example, as part of a new standard in an mmWave band, e.g., a 60 GHz frequency band or any other directional band, for example, as an evolution of an IEEE 802.11ad standard.

In some demonstrative embodiments, devices 102 and/or 140 may be configured according to one or more standards, for example, in accordance with an IEEE 802.11ay Standard, which may be, for example, configured to enhance the efficiency and/or performance of an IEEE 802.11ad Specification, which may be configured to provide WiFi connectivity in a 60 GHz band.

Some demonstrative embodiments may enable, for example, to significantly increase the data transmission rates defined in the IEEE 802.11ad specification, for example, from 7 Gbps, e.g., up to 30 Gbps, or to any other data rate, which may, for example, satisfy growing demand in network capacity for new coming applications.

Some demonstrative embodiments may be implemented, for example, to allow increasing a transmission data rate, for example, by applying Multiple Input Multiple Output (MIMO) and/or channel bonding techniques.

In some demonstrative embodiments, the IEEE 802.11ad-2012 Specification may be configured to support a Single User (SU) system, in which a Station (STA) may transmit frames to a single STA at a time.

In some demonstrative embodiments, a communication scheme may include Physical layer (PHY) and/or Media Access Control (MAC) layer schemes, for example, to support one or more applications, and/or increased transmission data rates, e.g., data rates of up to 30 Gbps, or any other data rate.

In some demonstrative embodiments, the PHY and/or MAC layer schemes may be configured to support frequency channel bonding over a mmWave band, e.g., over a 60 GHz band, Single User (SU) techniques, and/or Multi User (MU) MIMO techniques.

In some demonstrative embodiments, devices 102 and/or 140 may be configured to implement one or more mechanisms, which may be configured to enable SU and/or MU communication of Downlink (DL) and/or Uplink frames (UL) using a MIMO scheme.

In some demonstrative embodiments, devices 102 and/or 140 may be configured to communicate MIMO communications over the mmWave wireless communication band.

In some demonstrative embodiments, devices 102 and/or 140 may be configured to communicate over an NG60 network, an EDMG network, and/or any other network and/or any other frequency band. For example, devices 102 and/or 140 may be configured to communicate DL MIMO transmissions and/or UL MIMO transmissions, for example, for communicating over the NG60 and/or EDMG networks.

In some demonstrative embodiments, devices 102 and/or 140 may be configured to implement one or more techniques, which may, for example, enable to support communications over a MIMO communication channel, e.g., a SU-MIMO channel between two mmWave STAs, or a MU-MIMO channel between a STA and a plurality of STAs.

In some demonstrative embodiments, system 100 may include a device, e.g., device 102, which may be configured to perform one or more operations of, perform one or more functionalities of, and/or perform the role of a Base Station (BS), for example, an AP, or a node; and/or one or more devices device, e.g., including device 140, which may be configured to perform one or more operations of, perform one or more functionalities of, and/or perform the role of a Mobile Station (MS), e.g., a UE.

In some demonstrative embodiments, the BS may be configured to perfuming MU MIMO communication with the one or more UEs over the mmWave band, e.g., as described below.

In some demonstrative embodiments, the BS and the one or more UEs maybe configured to communicate the MU MIMO communication over a wireless network, e.g., in accordance with an IEEE 802.11 Specification, a WGA Specification a WFA Specification, and/or any other specification and/or protocol.

In some demonstrative embodiments, the BS and the one or more UEs maybe configured to communicate the MU MIMO communication over a wireless communication network, for example, in accordance with a 5G Specification, and/or any other network.

In some demonstrative embodiments, devices 102 and/or 140 may be configured to perform beam acquisition, e.g., to determine a beamforming scheme for communication, and/or beam tracking, e.g., refine, update and/or adjust the beamforming scheme, for example, in mmWave multiuser wireless communications systems, e.g., as described below.

A beamforming protocol may be based on a sequential sector sweep training, where a first station transmits a synchronization signal (SS) beamformed in different angles over different time symbols; and a second station applies an omnidirectional beam and scans over a plurality of time symbols to detect a best cell identifier (ID) and beam ID of the first station, and sends to the first station feedback indicating the best cell ID and the best beam ID. According to this beamforming protocol, the first station may then transmit with an omnidirectional beam to allow the second station to scan through different receive beams. However, this beamforming protocol may not be efficient and/or may suffer one or more deficiencies, e.g., in some implementations, scenarios and/or use cases. For example, an acquisition time according to the beamforming protocol may be long, at least since several time symbols may be required to acquire and define the best cell and beam direction. Additionally, for example, in non-line of sight (NLOS) channels, defining the best transmit and/or receive sector based on an omnidirectional pattern or a pseudo-omnidirectional pattern at a peer device may not be optimal. For example, ideally an exhaustive search, which is time consuming, should be performed with both transmitter and receiver employing beamforming vectors. One solution may include a further refinement stage where each of the first and second stations operates to transmit with the best beam, while the other device acts as a receiver to re-define the best receive sector. However, such a procedure may further increase the acquisition time, for example, especially if implemented for a multiuser (MU) case. For example, the beamforming protocol may result in different transmit and receive beams/sectors, for example, as the transmitter is optimized based on an omnidirectional pattern at the receiver, while the receiver is optimized for a directional transmission. This may result in a complex hardware implementation.

In some demonstrative embodiments, devices 102 and/or 140 may be configured to perform hybrid beam training (also referred to as "hybrid beamforming"), for example, for communications using a single carrier (SC) modulation, e.g., as described below. In other embodiments, devices 102 and/or 140 may be configured to perform hybrid beam training for any other additional or alternative modulation scheme, for example, for OFDM, e.g., as described below.

In some demonstrative embodiments, the hybrid beamforming (BF) may include simultaneous communication of multiple beams, which may be spatially multiplexed in multiple directions, e.g., during a same time symbol. For example, hybrid BF may include simultaneous transmission of multiple training beams in multiple directions; and/or simultaneous reception of multiple training beams from multiple directions. For example, the hybrid beamforming may include spatial multiplexing of multiple beams, e.g., as described below.

In some demonstrative embodiments, spatial multiplexing of multiple beams may be challenging, for example, if implemented with a SC modulation, e.g., as frequency multiplexing may not be easily facilitated.

In some demonstrative embodiments, a first station, e.g., a BS, and a second station, e.g., a UE, may be configured to implement a beam acquisition and/or tracking ("acquisition/tracking") algorithm, which may be configured to perform beam training using directional beams at both the BS and UE, e.g., to improve acquisition time, accuracy, and/or a link budget, for example, for OFDM and/or SC modulations, e.g., as described below.

In some demonstrative embodiments, device 102 and/or device 140 may be configured to operate according to a hybrid beamforming architecture, e.g., as described below.

For example, controller 124 may include, may be implemented as part of, may operate as, and/or may perform one or more functionalities of, a digital processor 127, e.g., a digital baseband processor, to perform digital processing of the hybrid beamforming architecture at device 102, and/or RF chains 109 may be configured to perform analog RF processing of the hybrid beamforming architecture at device 102, e.g., as described below.

For example, controller 154 may include, may be implemented as part of, may operate as, and/or may perform one or more functionalities of, a digital processor 157, e.g., a digital baseband processor, to perform digital processing of the hybrid beamforming architecture at device 140, and/or RF chains 149 may be configured to perform analog RF processing of the hybrid beamforming architecture at device 140, e.g., as described below.

In some demonstrative embodiments, the hybrid beamforming architecture may include, for example, a Modular Antenna Array (MAA) hybrid beamforming architecture, or a Full Antenna Array (FAA) hybrid beamforming architecture, e.g., as described below. In other embodiments, any other hybrid beamforming architecture may be implemented.

Figure 2:
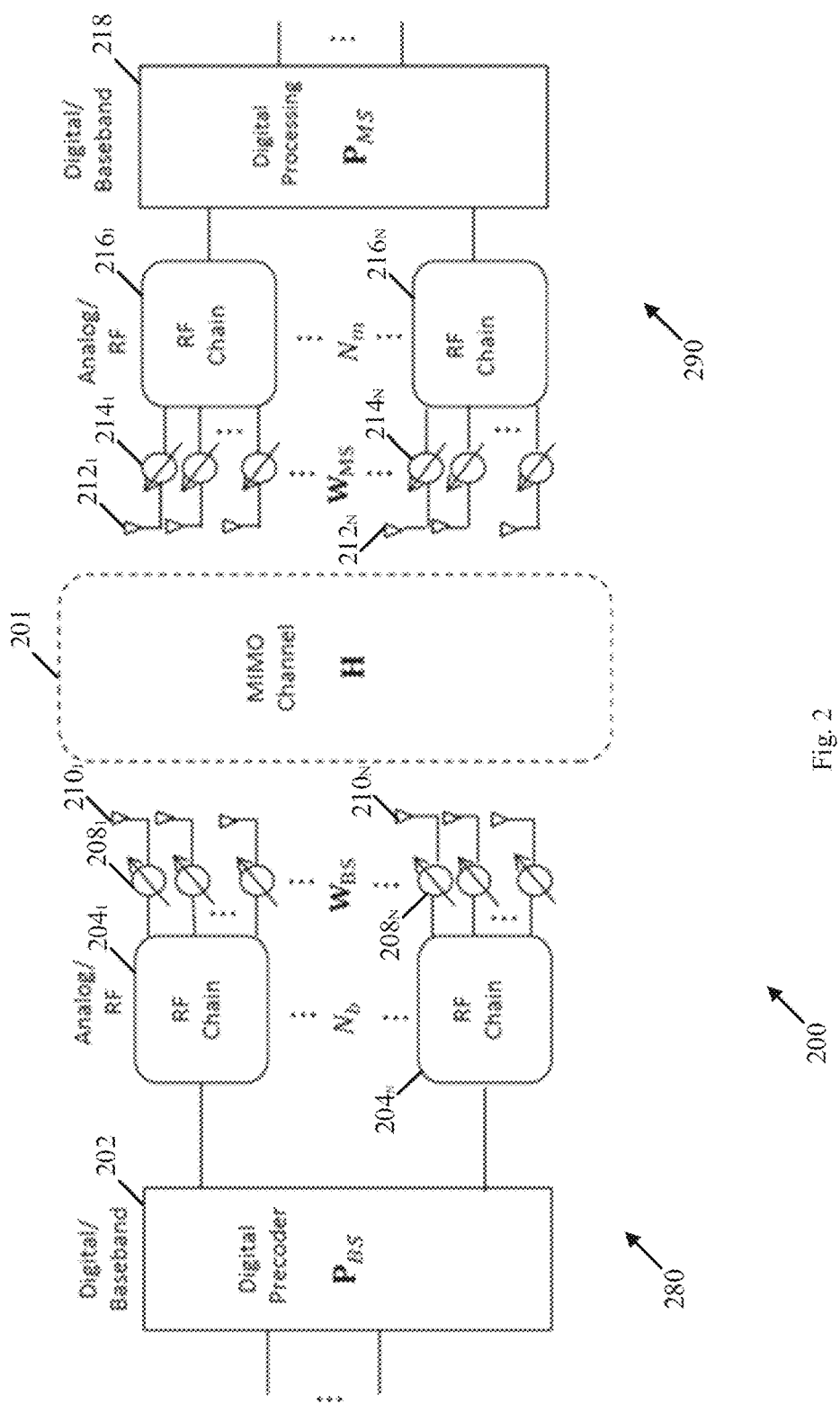
FIG. 2 is a schematic illustration of a Modular Antenna Array (MAA) hybrid beamforming architecture, in accordance with some demonstrative embodiments.

Reference is made to FIG. 2, which schematically illustrates a Modular Antenna Array (MAA) hybrid beamforming architecture 200, in accordance with some demonstrative embodiments.

In some demonstrative embodiments, as shown in FIG. 2, the MAA hybrid beamforming architecture 200 may be implemented for communication between a first wireless station 280, e.g., a base station, and a second wireless station 290, e.g., a mobile station. For example, device 102 (FIG. 1) may be configured to operate as, perform a role of, and/or perform one or more functionalities of, wireless station 280, and/or device 140 (FIG. 1) may be configured to operate as, perform a role of, and/or perform one or more functionalities of, wireless station 290.

In some demonstrative embodiments, the MAA hybrid beamforming architecture 200 may be configured to include both digital operation and analog operation in the beamforming process, e.g., in opposed to beamforming protocols implemented by other technologies such as, for example, Long Term Evolution (LTE), which include only digital beamforming processes.

In some demonstrative embodiments, as shown in FIG. 2, the MAA hybrid beamforming architecture 200 at wireless station 280 may include a transceiver including a digital precoder 202, which may be configured to modulate information into a plurality of N analog RF chains $204_1$-$204_N$. For example, digital processor 127 (FIG. 1) may perform one or more operations and/or functionalities of digital precoder 202; and/or RF chains 109 (FIG. 1) may perform one or more operations and/or functionalities of RF chain 204.

In some demonstrative embodiments, as shown in FIG. 2, the N RF chains 204 may be connected to N respective groups of phase shifters, one of which is illustrated at $208_1$, which may be configured to provide appropriate phase shift for each RF chain.

In some demonstrative embodiments, as shown in FIG. 2, each phase shifter 208 may be respectively coupled to an antenna, one of which is represented at $210_1$, for example, in a multiple input and multiple output (MIMO) configuration.

In some demonstrative embodiments, the RF chains 204 may perform analog processing of streams to be transmitted via the antennas 210 by way of a MIMO channel 210, denoted H, for reception at one or more other wireless stations, e.g., including wireless station 290.

In some demonstrative embodiments, as shown in FIG. 2, wireless station 290 may include a plurality of antennas, one of which is represented at 212$_1$, which may be, coupled, for example, to a plurality of respective phase shifters, one of which is represented at 214$_1$.

In some demonstrative embodiments, as shown in FIG. 2, wireless station 290 may include a plurality of analog RF chains, denoted 216$_1$-216$_N$, which may process signals from the phase shifters 212. For example, as shown in FIG. 2, RF chains 216 may be connected to respective groups of phase shifters.

In some demonstrative embodiments, as shown in FIG. 2, wireless station 290 may include a digital baseband processing module 218 to digitally process information received from RF chains 216. For example, digital processor 157 (FIG. 1) may perform one or more operations and/or functionalities of digital processor 218; and/or RF chains 149 (FIG. 1) may perform one or more operations and/or functionalities of RF chain 216.

In some demonstrative embodiments, as shown in FIG. 2, the MAA hybrid beamforming architecture 200 may be configured to perform analog beamforming processing of signals to be communicated at station 280 by a group of a plurality of antennas 210 using an RF chain 204, e.g., separate from other groups of antennas 210 associated with other RF chains 204; and/or to perform analog beamforming processing of signals to be communicated at station 290 by a group of a plurality of antennas 212 using an RF chain 216, e.g., separate from other groups of antennas 212 associated with other RF chains 216. For example, as shown in FIG. 2, the RF chain 204 may be associated with a separate group of antennas 210, e.g., separate from antennas associated with other RF chains. For example, as shown in FIG. 2, the RF chain 216 may be associated with a separate group of antennas 212, e.g., separate from antennas associated with other RF chains.

Figure 3:
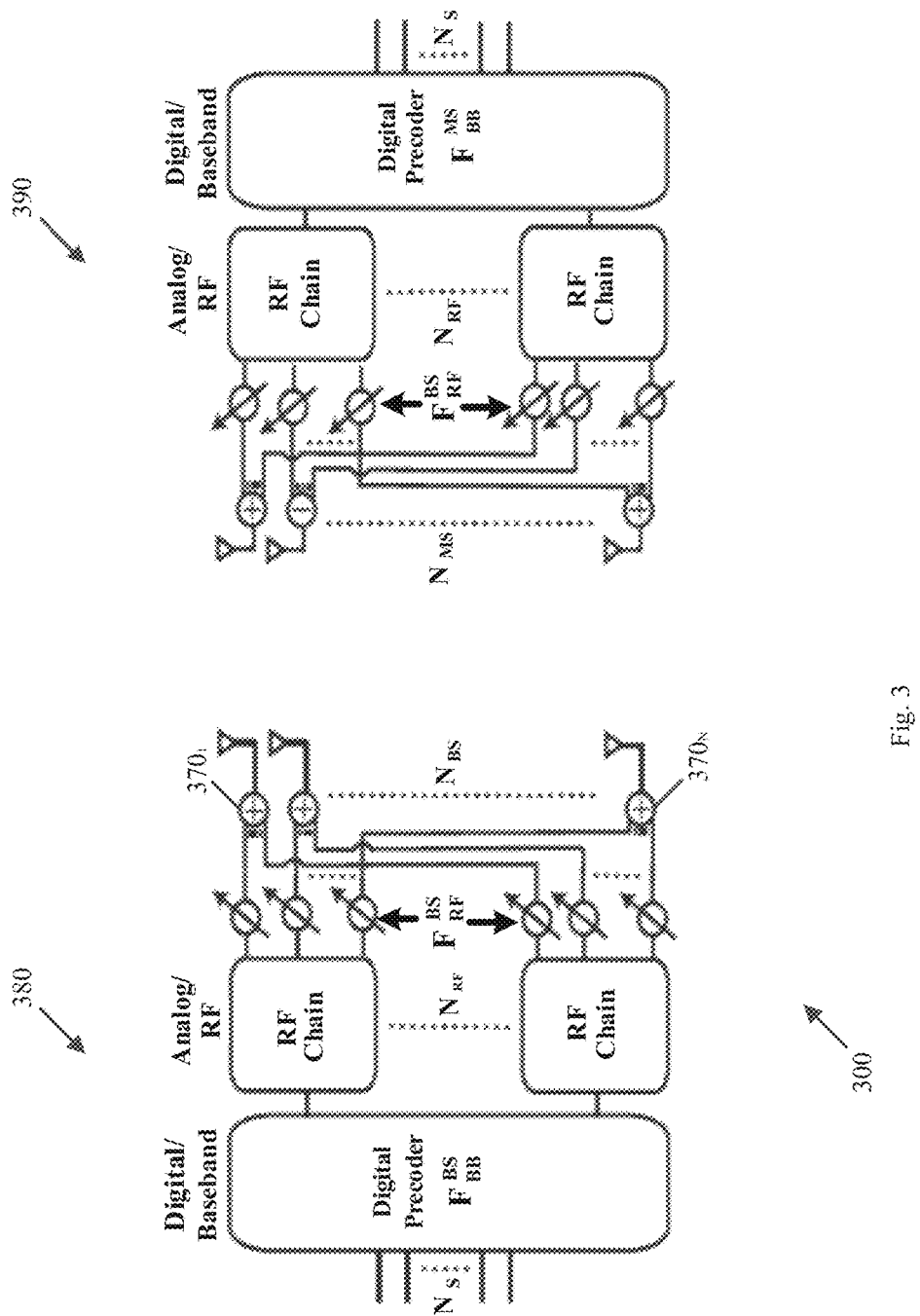
FIG. 3 is a schematic illustration of a Full Antenna Array (FAA) hybrid beamforming architecture, in accordance with some demonstrative embodiments.

FIG. 3 is a schematic illustration of a Full Antenna Array (FAA) hybrid beamforming architecture, in accordance with some demonstrative embodiments.

In some demonstrative embodiments, as shown in FIG. 3, the FAA hybrid beamforming architecture 300 may be implemented for communication between a first wireless station 380, e.g., a base station and a second wireless station 390, e.g., a mobile station. For example, device 102 (FIG. 1) may be configured to operate as, perform a role of, and/or perform one or more functionalities of, wireless station 380, and/or device 140 (FIG. 1) may be configured to operate as, perform a role of, and/or perform one or more functionalities of, wireless station 390.

In some demonstrative embodiments, as shown in FIG. 3, the FAA hybrid beamforming architecture 300 may utilize a plurality of RF chains, and respective plurality of groups of phase shifters, e.g., as described above with respect to the MAA hybrid beamforming architecture 200 (FIG. 2).

In some demonstrative embodiments, as shown in FIG. 3, the FAA hybrid beamforming architecture 300 may be configured to perform analog beamforming processing of signals to be communicated by the antennas using a combination of the RF chains and phase shifters. For example, each RF chain and associated phase shifters may process beamformed signals to be communicated via a combination of the antennas, e.g., even any combination of any of the antennas. For example, as shown in FIG. 3, FAA hybrid beamforming architecture 300 may utilize a plurality of combiners 370, e.g., OR gates or multiplexers, which may be configured to associate an antenna with phase shifters of a plurality of RF chains, e.g., even all RF chains.

Referring back to FIG. 1, in some demonstrative embodiments, devices 102 and/or 140 may be configured to implement a hybrid beamforming scheme, e.g., according to MAA hybrid beamforming architecture 200 (FIG. 2), FAA hybrid beamforming architecture 300 (FIG. 3), and/or any other hybrid beamforming architecture.

In some demonstrative embodiments, devices 102 and/or 140 may be configured to utilize digital processing in the hybrid antenna architecture, for example, digital baseband processing as described above with reference to FIGS. 2 and/or 3, for example, to perform hybrid beamforming training.

In some demonstrative embodiments, the hybrid beamforming training may include parallel transmission of reference Synchronization Signals (SS), for example, from device 102, e.g., a base station; and/or parallel processing of received SS at device 140, e.g., a UE.

In some demonstrative embodiments, devices 102 and/or 140 may be configured to perform the hybrid beamforming training, for example, by employing directional beam training, e.g., by both devices 102 and 140, for example, in a plurality of, e.g., simultaneous, directions, e.g., as described below.

In some demonstrative embodiments, the hybrid beam training may include spatial frequency multiplexing of the SS in a plurality of different directions, e.g., angles, e.g., as described below.

In some demonstrative embodiments, the hybrid beamforming training may enable, for example, to reduce the acquisition time, to improve accuracy of beam acquisition, to improve beamforming gain and/or to improve an efficiency of MU beamforming training, e.g., as described below.

In some demonstrative embodiments, the hybrid beamforming training may be performed between a first station ("Tx device"), which may be configured to transmit a plurality of SS to train a BF scheme for communicating with one or more second stations ("Rx device"), e.g., as described below. In one example, the Tx device may include a BS, and/or the Rx device may include a MS or a UE.

In some demonstrative embodiments, device 102 may be configured to operate as, perform a role of, and/or perform one or more functionalities of the Tx device; and/or device 140 may be configured to operate as, perform a role of, and/or perform one or more functionalities of the Rx device.

In some demonstrative embodiments, additionally or alternatively, device 140 may be configured to operate as, perform a role of, and/or perform one or more functionalities of the Tx device; and/or device 102 may be configured to operate as, perform a role of, and/or perform one or more functionalities of the Rx device.

In some demonstrative embodiments, the Tx device may include $N_b$ RF chains. For example, RF chains 109 may include $N_b$ RF chains.

In some demonstrative embodiments, the Tx device, e.g., device 102, may be configured to beamform a SS in a plurality of different directions, for example, including $N_T \leq N_b$ different directions, e.g., as described below.

In some demonstrative embodiments, the Tx device, e.g., device 102, may be configured to multiplex $N_T$ beams and simultaneously transmit the SS via the $N_T$ multiplexed beams, e.g., simultaneously, for example, during the same time symbol, e.g., as described below.

In some demonstrative embodiments, the Tx device, e.g., device 102, may be configured to beamform the SS in $N_T$ different directions, for example, multiplexed in space, and orthogonal in frequency, e.g., as described below.

In some demonstrative embodiments, the Rx device, e.g., device 140, may be able, for example, to apply a frequency domain equalizer (FDE), and to recognize and calculate the received signal-to-noise ratio (SNR) related to $N_T$ Angles of Departures (AODs) of the $N_T$ multiplexed beams from the Tx device, e.g., in a frequency domain.

In some demonstrative embodiments, the Rx device, e.g., device 140, may include, for example, a plurality of $N_U$ RF chains. For example, RF chains 149 may include $N_U$ RF chains.

In some demonstrative embodiments, the Rx device, e.g., device 140, may be configured to process the received signals at a plurality of different Angles of Arrival (AoAs), e.g., including $N_R \leq N_U$ different AoAs, for example, in parallel, e.g., simultaneously.

In some demonstrative embodiments, the hybrid beamforming training utilizing the parallel transmission of the $N_T$ beams at the Tx side, and the parallel reception of the $N_R$ beams at the Rx device may allow, for example, to achieve a reduced acquisition time, e.g., even by a factor of at least $N_T * N_R$.

In some demonstrative embodiments, the hybrid beamforming training utilizing the parallel transmission of the $N_T$ beams at the Tx side and the parallel reception of the $N_R$ beams at the Rx device may allow, for example, to maintain a communication range and/or a link budget, for example, as a transmit power, and/or a received SNR for the multiplexed signals may be maintained, e.g., as described below.

In some demonstrative embodiments, the Rx device, e.g., device 140, may be configured to process the plurality of $N_R$ different receive directions in parallel, e.g., simultaneously, for example, to measure the channel strength corresponding to the plurality of receive directions, and to feedback to the Tx device a best beam direction, e.g., as described below.

Figure 4:
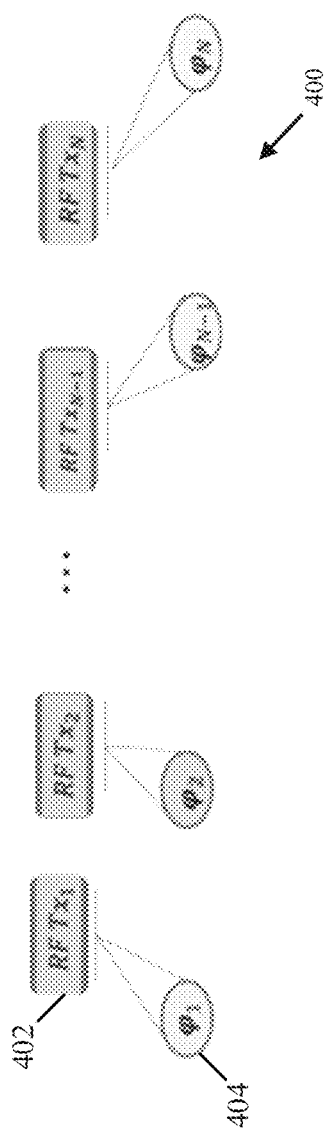
FIG. 4 is a schematic illustration of a hybrid beamforming scheme to beamform a plurality of Synchronization Signals (SS) in a plurality of directions, in accordance with some demonstrative embodiments.

Reference is made to FIG. 4, which schematically illustrates a hybrid beamforming scheme 400 to beamform a plurality of SS in a plurality of directions, in accordance with some demonstrative embodiments. For example, a Tx device, e.g., device 102 (FIG. 1) may be configured to beamform a plurality of SS according to the hybrid beamforming scheme of FIG. 4.

In some demonstrative embodiments, as shown in FIG. 4, a Tx device, e.g., device 102, may be configured to operate the $N_b$ RF chains 402, e.g., RF chains 109, to transmit the SS beamformed in $N_T$ beams at a plurality of respective angles 404 denoted $\varphi_1, \varphi_2, \ldots \varphi_N$.

Referring back to FIG. 1, in some demonstrative embodiments, devices 102 and/or 140 may be configured to perform the hybrid BF training, for example, as part of an initial cell search/acquisition, for beam selection, and/or as part of one or more additional or alternative operations, protocols, algorithms, and/or procedures.

In some demonstrative embodiments, in order to perform an initial cell search, a UE, e.g., device 140, may be pre-configured with information about where the SS from the Tx device, e.g., the BS, is to be allocated in the frequency domain; and/or the SS may be unique, e.g., in order to identify the cell.

In some demonstrative embodiments, an SS allocation may be dynamically configured and provisioned by a serving BS, e.g., device 102, for example, using system broadcast information, for example, in order to perform beam selection, which may take place after the UE, e.g., device 140, is attached to the serving BS. For example, the BS, e.g., device 102, may be configured to transmit the same SS over multiple beams simultaneously, and the serving BS may provide to the UE information about how to identify a beam, e.g., based on where a corresponding SS is located in the time and frequency domain.

In some demonstrative embodiments, devices 102 and/or 140 may be configured to communicate according to a SC modulation scheme. For example, in mmWave links for frequencies higher than 30 GHz, e.g. 60 GHz or 73 GHz, the SC modulation may be preferred, for example, to maintain a low peak-to-average power ratio (PAPR), and/or lower sensitivity to frequency offsets and/or phase noise. For example, beamforming gain may be an important factor, e.g., even for initial cell search, for example, in higher frequency ranges of the mmWave spectrum.

In some demonstrative embodiments, devices 102 and/or 140 may be configured to perform hybrid UE/Cell and/or beam acquisition in mmWave multiuser wireless communications, for example, using SC modulation, e.g., as described below. In other embodiments, devices 102 and/or 140 may be configured to perform hybrid UE/Cell and/or beam acquisition in mmWave multiuser wireless communications, for example, using an OFDM modulation scheme or any other modulation scheme, e.g., as described below.

In some demonstrative embodiments, when using an OFDM modulation scheme, spatial multiplexing may be achieved, for example, by transmitting multiple beams from multiple RF chains, e.g., by assigning orthogonal subcarriers to different RF chains.

In some demonstrative embodiments, device 102 may be configured to modulate a plurality of SS according to a SC modulation, and to utilize a spatial-frequency multiplexing scheme to spatially multiplex the plurality of SS beamformed in a plurality of directions, e.g., as described below. For example, controller 124 may include, operate as, and/or perform one or more functionalities of, a modulator 129, which may be configured to apply the spatial-frequency multiplexing scheme to the SS, e.g., as described below.

In some demonstrative embodiments, device 140 may be configured to process a plurality of SS according to a SC modulation, and to utilize a spatial-frequency multiplexing scheme to spatially demultiplex the plurality of received SS beamformed in the plurality of directions, e.g., as described below. For example, controller 154 may include, operate as, and/or perform one or more functionalities of, a demodulator 159, which may be configured to process the received SS according to the spatial-frequency multiplexing scheme, e.g., as described below.

In some demonstrative embodiments, the spatial-frequency multiplexing scheme may include an Interleaved Frequency Division Multiplexing (IFDM) scheme, e.g., as described below. In other embodiments, and other spatial-frequency multiplexing scheme may be used.

In some demonstrative embodiments, device 102 may be configured to utilize the IFDM scheme at Tx 118, for example, to provide spatial frequency multiplexing of multiple training beams modulated according to an SC modulation scheme, e.g., as described below.

In some demonstrative embodiments, device 140 may be configured to utilize the IFDM scheme at Rx 146, for example, to provide spatial frequency demultiplexing of multiple training beams modulated according to an SC modulation scheme, e.g., as described below.

In some demonstrative embodiments, device 102 may be configured to multiplex the $N_T$ beams, which may be modulated according to the SC scheme, and to simultaneously transmit the $N_T$ beams during a same time symbol, e.g., as described below.

In some demonstrative embodiments, when applying a SC modulation, a data symbol, e.g., a Quadrature Amplitude Modulation (QAM) symbol, may be spread over an entire dedicated bandwidth. A Block-wise single carrier (BWSC) modulation may include a SC scheme, which may be configured to allow utilizing a frequency domain equalization (FDE) capability, e.g., at the Rx device. As opposed to OFDM, frequency domain multiplexing with BWSC is not well established.

In some demonstrative embodiments, an IFDM scheme may be utilized, for example, to enable orthogonal Frequency Division Multiplexing (FDM) over a BWSC transmission. For example, according to an IFDM scheme, an incoming QAM symbol may be repeated/rotated for a plurality of R>1 times and then SC modulated. As the result, an IFDM-BWSC stream may occupy only a portion, e.g., 1/R, of the SC allocated tones/bandwidth. Accordingly, other portions of the SC bandwidth may be assigned to other IFDM streams. For example, a total of R streams may be multiplexed with an R symbol repetition over each stream.

Figure 5:
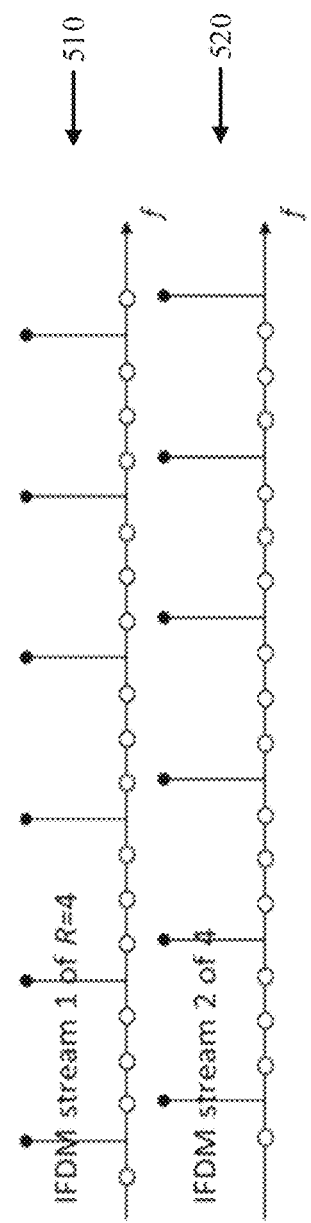
FIG. 5 is a schematic illustration of a pattern of first and second streams according to an Interleaved Frequency Division Multiplexing (IFDM) scheme, in accordance with some demonstrative embodiments.

Reference is made to FIG. 5, which schematically illustrates a pattern of a first stream 510 and a second stream 520 according to an IFDM scheme, e.g., of an IFDM scheme including R=4 streams, in accordance with some demonstrative embodiments.

As shown in FIG. 5, a spectrum of each of the first stream 510 and the second stream 520 may have, for example, a comb pattern, e.g., with a repetition rate of 4 symbols. As shown in FIG. 5, the streams 510 and 520 may be interleaved, e.g., with no overlap.

In some demonstrative embodiments, the non-overlapping spectrums of the IFDM streams, e.g., streams 510 and 520, may be fully orthogonal in the frequency domain.

Figure 6:
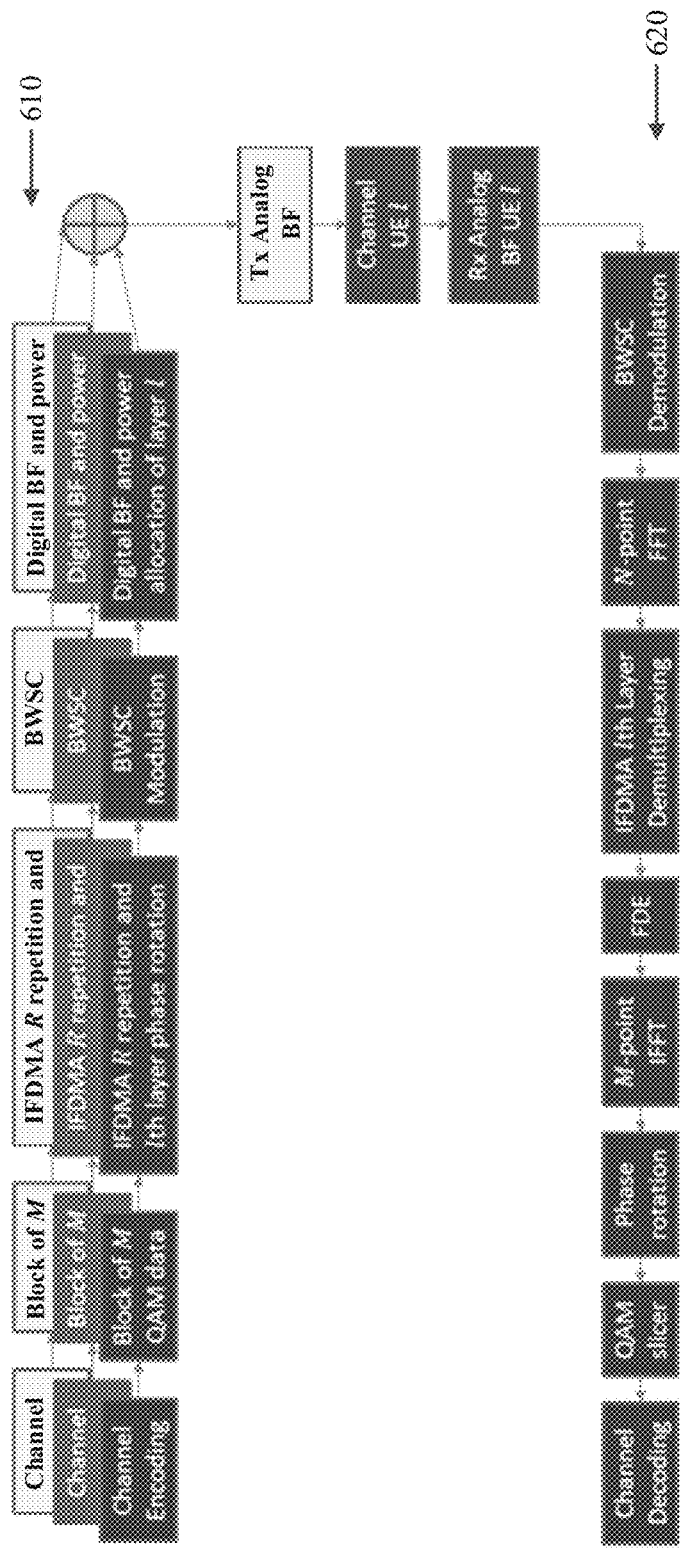
FIG. 6 is a schematic illustration of an IFDM scheme, in accordance with some demonstrative embodiments.

FIG. 6 is a schematic illustration of an IFDM scheme 600 to communicate an IFDM from a transmitter device 610 to one or more receiver devices 620, in accordance with some demonstrative embodiments. For example, device 102 (FIG. 1) may be configured to operate as, perform a role of, and/or perform one or more functionalities of, transmitter device 610, and/or device 140 (FIG. 1) may be configured to operate as, perform a role of, and/or perform one or more functionalities of, receiver device 620.

In some demonstrative embodiments, the transmitter device 610 may be configured to transmit a transmission including a plurality of data streams multiplexed according to an IFDM-BWSC modulation, and/or the receiver device 620 may be configured to apply an IFDM-BWSC demodulation to determine the plurality of streams of data, e.g., as described below. For example, controller 124 (FIG. 1) and/or modulator 129 (FIG. 1) may be configured to multiplex the plurality of SS according to the IFDM-BWSC modulation; and/or controller 154 (FIG. 1) and/or demodulator 159 (FIG. 1) may be configured to demultiplex the plurality of SS according to the IFDM-BWSC modulation, e.g., as descried below.

In some demonstrative embodiments, a block of M QAM symbols may be rotated/repeated R times, for example, such that N=MR.

In some demonstrative embodiments, a plurality of R streams, e.g., having a stream index l=0, . . . , (R−1), may each include a plurality of M input QAM symbols, denoted $q_m^l$, wherein m=0, . . . , (M−1). For example, a power of the symbol may be P.

In some demonstrative embodiments, an IFDM stream, denoted $x_n^l$ may be formed, for example, as follows:

$$x_n^l = q_{rm}^l = q_m^l \exp\left(\frac{j2\pi lr}{R}\right) \quad (1)$$

wherein:

$n = rM + m$, such that $0 \le n \le (N-1)$ $r = 0, \ldots, (R-1)$ $m = 0, \ldots, (M-1)$ $l = 0, \ldots, (R-1)$ is the stream index In some demonstrative embodiments, a plurality of IFDM streams may be combined to form a multiplexed signal, denoted $x_n$, for example, by IFDM multiplexing over BWSC modulation, e.g., as follows:

$$x_n = \sum_{l=0}^{L-1} \alpha_l x_n^l, n = 0, \ldots, (N-1) \quad (2)$$

wherein:

$1 \le L \le R$ is the number of multiplexed layers $\alpha_l$ is a power scaling of the layer l such that $\sum_{l=0}^{L-1} \alpha_l^2 \le 1$ In case of equal transmit power of layers:

For fixed power allocation per layer independent of number of layers $\alpha = \frac{1}{\sqrt{R}}$ For fixed total power with dynamic power per layer $\alpha = \frac{1}{\sqrt{L}}$ In some demonstrative embodiments, the multiplexed signal $x_n$ may be passed through a BWSC modulator.

In some demonstrative embodiments, for example, if spatial multiplexing is combined with IFDM multiplexing, the stream $x_n^l$ may be passed through the BWSC modulator; BWSC modulated signals may be passed through layer-specific precoders; and precoded layers may be combined, for example, such that layers are separated in the space-frequency domain.

In some demonstrative embodiments, at the receiver 520, received IFDM streams may be separated in a frequency domain, for example, due to the non-overlapping comb pattern of the IFDM streams in the frequency domain, e.g., as described above with reference to FIG. 5.

In some demonstrative embodiments, a total transmit power may be shared amongst the R multiplexed IFDM streams. However, as a result of the repetition in the time domain, a power accumulation may maintain an SNR of each IFDM stream, e.g., as if there is no power splitting. Accordingly, the IFDM may not degrade a link budget, e.g., as described below.

In some demonstrative embodiments, a baseline BWSC may modulate, for example, N QAM symbols, for example, per BWSC symbols $x_n$, e.g., wherein n=0, . . . , (N−1).

In some demonstrative embodiments, a received signal, for example, after demodulation at a receive may be represented, for example, by $y_n = x_n + n_n$, for example, wherein $n_n$ denotes noise with a power $N_0$.

In some demonstrative embodiments, an SNR of the received signal according to the baseline BWSC may be determined, for example, as follows:

$$SNR = P/N$$

$$P = E\{|x_n|^2\} \quad (3)$$

In some demonstrative embodiments, an IFDM signal may be represented by $$x_n = \sum_{l=0}^{L-1} \alpha_l x_n^l, \, n = 0, \ldots, N-1,$$

e.g., as described above. Accordingly, a spectrum of every IFDM layer may be represented, for example, by:

$$X_k^l = FFT_N(x_n^l) = \frac{1}{\sqrt{N}} \sum_{n=0}^{N-1} x_n^l \exp\left(\frac{-j2\pi kn}{N}\right) = \quad (4)$$

$$= \frac{1}{\sqrt{N}} \sum_{r=0}^{R-1} \sum_{m=0}^{M-1} q_m^l \exp\left(\frac{j2\pi lr}{R}\right) \exp\left(\frac{-j2\pi k(rM+m)}{MR}\right) =$$

$$= \sum_{r=0}^{R-1} \exp\left(\frac{j2\pi r(l-k)}{R}\right) \frac{1}{\sqrt{N}} \sum_{m=0}^{M-1} q_m^l \exp\left(\frac{-j2\pi km}{MR}\right)$$

For example, in a simplified manner, the spectrum of every IFDM layer may be represented, for example, by:

$$X_k^l = R\delta_{k-l \text{ factor of } R} FFT_N(\{q_m^l\}_{m=0,\ldots,M-1}) \quad (5)$$

or:

$$X_k^l = \begin{cases} RFFT_N(q_m^l), & k = l, l+R, \ldots, l+(M-1)R \\ 0, & \text{otherwise} \end{cases} \quad (6)$$

This representation may confirm, for example, that IFDM layers may be separated in the frequency domain, for example, where l represents the IFDM stream or "channel".

In some demonstrative embodiments, the received signal, for example, after BWSC demodulation may be represented as follows, e.g., assuming an Additive white Gaussian noise (AWGN) channel with the noise power $N_0$:

$$y_n = x_n + n_n = \sum_{l=0}^{L-1} \alpha_l x_n^l + n_n \quad (7)$$

In some demonstrative embodiments, the received signal, for example, after BWSC demodulation may be represented in the frequency domain, e.g., as follows:

$$Y_k = FFT_N(y_n) = \sum_{l=0}^{L-1} \alpha_l X_k^l + I_k \quad (8)$$

wherein $I_k$ denotes noise in frequency domain with a variance $N_0$, and wherein $\{Y_k\}_{k=l,l+R,\ldots,l+(M-1)R}$ represents $Y_k^l$ for an l-th IFDM layer.

Accordingly, the IFDM layers may be, for example, easily separated and de-multiplexed in the frequency domain. In case of a fading channel, for example, $Y_k^l$ may be equalized.

In some demonstrative embodiments, after demultiplexing, the time domain signal of a given stream may be reconstructed, for example, by an M-point Inverse Fast Fourier Transform (IFFT), for example, to reconstruct original time domain QAM symbols, e.g., as follows:

$$Z_t^l = \quad (9)$$

$$IFFT_M(\{Y_k^l\}_{k=l,l+R,\ldots,l+(M-1)R}) = IFFT_M(\{X_k^l\}_{k=l,l+R,\ldots,l+(M-1)R}) + i_t$$

wherein $i_t$ denotes noise with the power $N_0$, and wherein t=0, 1, ..., (M−1).

In some demonstrative embodiments, Equation 9 may be rewritten, for example, by replacing $X_k^l$, e.g., as follows:

$$Z_t^l = \frac{1}{\sqrt{M}} \sum_{k'=0}^{M-1} X_k^l \exp\left(\frac{j2\pi k't}{M}\right) + i_t, \, k = l + k'R \quad (10)$$

In some demonstrative embodiments, Equation 10 may be simplified, e.g., as follows:

$$Z_t^l = \frac{R}{\sqrt{MN}} \sum_{k'=0}^{M-1} \sum_{m=0}^{M-1} q_m^l \exp\left(\frac{-j2\pi(l+k'R)m}{MR}\right) \exp\left(\frac{j2\pi k't}{M}\right) + i_t = \quad (11)$$

$$= \frac{R}{\sqrt{MN}} \sum_{m=0}^{M-1} q_m^l \exp\left(\frac{-j2\pi lm}{MR}\right) \left\{\sum_{K'=0}^{M-1} \exp\left(\frac{j2\pi k'(t-m)}{M}\right)\right\} + i_t =$$

$$= \frac{RM}{\sqrt{MN}} \sum_{m=0}^{M-1} q_m^l \exp\left(\frac{-j2\pi lm}{MR}\right) \delta_{t-m} + i_t$$

In some demonstrative embodiments, Equation 11 may be simplified, e.g., as follows:

$$Z_t^l = \sqrt{R} q_t^l \exp\left(\frac{-j2\pi lt}{MR}\right) + i_t \quad (12)$$

According to the above formulation, the SNR after Rx processing of a received QAM symbol may be expressed, for example, as follows:

$$SNR_{IFDMA} = \frac{\alpha_l^2 RP}{N_0} \quad (13)$$

In some demonstrative embodiments, for example, in case $$\alpha_l = \frac{1}{\sqrt{R}},$$

the SNR of an IFDM scheme may be $$SNR_{IFDMA} = \frac{P}{N_0},$$

which is the same as the SNR for the baseline BWSC. Accordingly, the IFDM multiplexing may maintain the SNR as the BWSC modulation, e.g., even with no link budget loss.

In some demonstrative embodiments, devices 102 and/or 140 may be configured to utilize a Codebook (CB) mechanism during the hybrid beamforming training, e.g., as described below.

In some demonstrative embodiments, devices 102 and/or 140 may utilize a multi-layer codebook mechanism, for example, to generate beams having multiple beam widths, e.g., as described below.

In some demonstrative embodiments, controller 124 may include, operate as, and/or perform one or more functionalities of a CB applier 131, e.g., a multi-layer CB applier, which may be configured to control one or more beamforming settings of antennas 107 according to the codebook mechanism, e.g., as described below.

In some demonstrative embodiments, controller 154 may include, operate as, and/or perform one or more functionalities of a CB applier 161, e.g., a multi-layer CB applier, which may be configured to control one or more beamforming settings of antennas 147 according to the codebook mechanism, e.g., as described below.

In some demonstrative embodiments, devices 102 and/or 140 may utilize a two-layer codebook mechanism, for example, to generate beams having two different beam widths, e.g., as described below. In other embodiments, a codebook mechanism implementing any other number of layers, e.g., more than two layers, may be utilized to generate beams of any other respective number of beam widths, e.g., more than two beam widths.

In some demonstrative embodiments, the CB mechanism may be configured to generate a plurality of analog beams having a different Half-Power Beam Width (HPBW), e.g., as described below.

In some demonstrative embodiments, a two-layer codebook may include a first layer to generate beams of a first width ("wide beams"). A codeword of the first layer, e.g., each code word, may be associated with a codebook in a second layer, which may generate a plurality of beams of a second width ("narrow beams"), e.g., having a beam width which is narrower than the first width, for example, in a angular range of the first layer code word, e.g., as described below.

In some demonstrative embodiments, the two-layer codebook may be utilized in a two-level beam acquisition, for example, to use the wide beams for initial acquisition, and the narrow beams for beam refinement and/or as tracking.

In some demonstrative embodiments, a codebook may include a plurality of codewords defining a respective plurality of beamforming vectors, e.g., RF beamforming vectors to be applied for RF beamforming at a plurality of RF chains, e.g., at RF chains 109 or RF chains 149.

For example, the first codebook may include a plurality of first codewords defining RF beamforming vectors to form a respective plurality of wide beams.

For example, a codeword of the first codebook e.g., each codeword of the first codebook, may be associated with a second codebook.

For example, the second codebook corresponding to a codeword of the first codebook may include a plurality of codewords defining RF beamforming vectors to form a respective plurality of narrow beams, for example, within the wide beam defined by the codeword of the first codebook.

In some demonstrative embodiments, CB applier 131 (FIG. 1) may be configured to apply a codeword, for example, a codeword of the first codebook and/or a codeword of the second codebook, for example, by applying a vector of phase shifts to phase shifters of antenna elements of antenna 107, e.g., according to MAA architecture 200 (FIG. 2) and/or FAA architecture 300 (FIG. 3), which is configured to form a beam over the direction defined by the codeword.

In some demonstrative embodiments, CB applier 161 (FIG. 1) may be configured to apply a codeword, for example, a codeword of the first codebook and/or a codeword of the second codebook, for example, by applying a vector of phase shifts to phase shifters of antenna elements of antenna 147, e.g., according to MAA architecture 200 (FIG. 2) and/or FAA architecture 300 (FIG. 3), which is configured to form a beam over the direction defined by the codeword.

In some demonstrative embodiments, the two-layer codebook may be utilized to provide a variable beam-broadening scheme, for example, for RF beamforming with a desired HPBW, e.g., while employing a same number of antenna elements.

Figure 7:
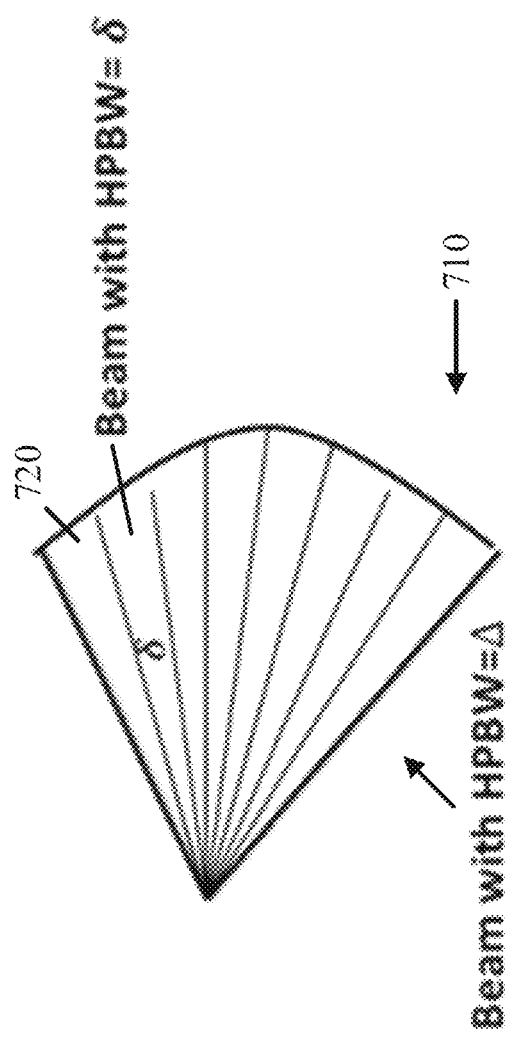
FIG. 7 is a schematic illustration of a two-layer beamforming scheme allocating a plurality of narrow beam directions to a wide beam direction, in accordance with some demonstrative embodiments.

Reference is made to FIG. 7, which schematically illustrates a two-layer beamforming scheme allocating a plurality of narrow beam directions 720 to a wide beam direction 710, in accordance with some demonstrative embodiments.

In one example, a Tx device, e.g., device 102 (FIG. 1) may be configured to beamform a plurality of SS to be transmitted according to the two-layer beamforming scheme of FIG. 7.

In one example, an Rx device, e.g., device 140 (FIG. 1) may be configured to process a plurality of received SS according to the two-layer beamforming scheme of FIG. 7.

In some demonstrative embodiments, devices 102 and/or 140 (FIG. 1) may be configured to utilize the two-layer beamforming scheme of FIG. 7, for example, for hierarchical beam acquisition, e.g., as described below.

In some demonstrative embodiments, the two-layer beamforming scheme of FIG. 7 may define a plurality of codewords of a first layer (layer-1) codebook having a wide HPBW=$\Delta$. For example, a codeword of the layer-1 codebook may define the wide beam direction 710.

In one example, the HPBW may be set to $\Delta=15$ degrees. According to this example, the layer-1 codebook may include 8 codewords, for example, to cover an azimuth of (−60, 60) degrees.

In some demonstrative embodiments, the two-layer beamforming scheme of FIG. 7 may define a plurality of second layer (layer-2) codebooks. For example, each layer-1 codeword may be associated with a layer-2 codebook, which may include a plurality of layer-2 codewords having a narrower HPBW=$\delta$ (layer-2), e.g., within the range of $\Delta$.

For example, as shown in FIG. 7, for $\delta=2$, there may be 8 codewords 720 in layer-2 associated with each codeword 710 of layer-1.

Referring back to FIG. 1, in some demonstrative embodiments, devices 102 and/or 140 may be configured to perform the hybrid beamforming training utilizing the two-layer CB scheme for analog beamforming, for example, to facilitate fast beam acquisition and/or tracking, e.g., even with directional beams at both the transmitter and receiver.

In some demonstrative embodiments, devices 102 and/or 140 may be configured to perform a two-stage hybrid acquisition procedure, which may include using a plurality of wide beams at a first stage, and using narrower beams at a second stage, for example, while utilizing directional beams at both devices 102 and 140 during both stages, e.g., as described below.

In some demonstrative embodiments, device 102 may be configured to operate as, perform a role of, and/or perform one or more functionalities of, a BS to perform hybrid beamforming with a plurality of UEs; and/or device 140 may be configured to operate as, perform a role of, and/or perform one or more functionalities of a UE to perform the hybrid beamforming with the BS, e.g., as described below.

In some demonstrative embodiments, the Tx device, for example, a BS, e.g., device 102, may include $N_b$ RF chains, and/or the Rx device, for example, a UE, e.g., device 140, may include $N_u$ RF chains.

In some demonstrative embodiments, devices 102 and/or 140 may be configured to perform the hybrid beamforming training according to first and second stages, e.g., as described below.

In some demonstrative embodiments, devices 102 and/or 140 may be configured to perform a hybrid beamforming training stage ("stage 1") using a plurality of wide beams, e.g., the beams HPBW=Δ, which may be generated by the first codebook layer (CB-1), e.g., at both the BS and the UE.

In some demonstrative embodiments, during the stage 1, the BS, e.g., device 102, may beamform a reference signal, e.g., a PSS or an SSS, for example, in $N_T \leq N_b$ different directions, for example, using the CB-1, and may transmit the beamformed reference signal simultaneously from the $N_b$ RF chains of the BS.

In some demonstrative embodiments, for example, if the number of code words in the CB-1 is greater than $N_T$, the BS may multiplex the codewords over time.

In some demonstrative embodiments, during the stage 1, the UE, e.g., device 140, may apply receive beamforming vectors using the CB-1, for example, over the $N_u$ receive RF chains, for example, to process the receive beamformed channel in $N_R \leq N_u$ directions in parallel. For example, in each receive RF chain, the UE may be able to distinguish and measure the beamformed channel, e.g., in the frequency domain, for example, in $N_T$ transmit directions in parallel, for example, by performing IFDM de-multiplexing, e.g., as described above.

In some demonstrative embodiments, for example, if a number of code words for training in the CB-1 is higher than $N_R$, the BS may repeat the transmission over different symbols, for example, to allow the UE to perform the beam search, e.g., over all directions of the CB-1.

In some demonstrative embodiments, the UE may be configured to define a best receive wide beam of the UE and a best wide transmit beam of the BS, for example, based on the received beamformed signals.

In some demonstrative embodiments, the UE may be configured to feedback to the BS a report on the best transmit beam of the BS, e.g., by applying the direction of the best receive beam for transmitting the feedback.

In some demonstrative embodiments, devices 102 and/or 140 may be configured to perform a hybrid beamforming training stage ("stage 2") using a plurality of narrow beams, e.g., the beams HPBW=δ, which may be generated by the second codebook layer (CB-2), e.g., at both the BS and the UE.

In some demonstrative embodiments, during the stage 2, the BS, e.g., device 102, may be configured to identify one or more wide beams ("sectors"), based on the feedback from one or more UEs.

In some demonstrative embodiments, the BS may be configured to select to transmit only narrower beams, e.g., using the CB-2, which are associated with the reported best wide beams.

In some demonstrative embodiments, the BS may be configured to transmit $N_T$ signals simultaneously from the $N_b$ RF chains of the BS.

In some demonstrative embodiments, the same training signal may be shared, for example, among UEs who reported the same best beams at the stage 1.

In some demonstrative embodiments, the BS may be configured, for example, to multiplex, e.g., in a Time Division Multiplexing (TDM) manner, signals for two or more UEs, which have indicated two or more different best wide beams in the feedback of the stage 1.

In some demonstrative embodiments, a UE, e.g., every UE, may select codewords of the CB-2, for example, based on the best sector (wide beam) identified by the UE at the stage 1. For example, the UE may select to apply during the stage 2 receive beamforming vectors using CB-2 only in the range associated with the selected wide beam of the BS identified by the UE at stage 1.

In some demonstrative embodiments, the UE may be configured to process the received beamformed channel in the $N_R$ directions, e.g., in parallel, for example, to distinguish and measure the beamformed channel, e.g., in the frequency domain, in the $N_T$ transmit directions, e.g., in parallel.

In some demonstrative embodiments, the UE may be configured to define a best narrow receive beam of the UE and a best narrow transmit beam of the BS, for example, based on the received beamformed signals.

In some demonstrative embodiments, the UE may be configured to feedback to the BS a report on the best narrow transmit beam of the BS, e.g., by applying the direction of the best narrow receive beam for transmitting the feedback.

In some demonstrative embodiments, devices 102 and/or 140 may be configured to utilize the Stage I for initial beamforming acquisition, and/or to utilize Stage-II, for example, for beam tracking, for example, while using frequent feedbacks from UEs.

In some demonstrative embodiments, the hybrid transmit beam training, e.g., as performed by the BS, may not degrade link budget, while hybrid receive beam training may result in some loss of link budget, for example, a loss of about $10 \log_{10} N_R$. However, considering the directional beam transmission, the link budget may already be above the conventional schemes.

Some demonstrative embodiments are described above with respect to hybrid beamforming using SC modulation. In other embodiments, the hybrid beamforming training may be applied using an OFDM modulation, or any other modulation, e.g., using a different waveform.

In some demonstrative embodiments, the hybrid beamforming training may be implemented by a MU system including a BS and a plurality of K UEs, for example, to enable the BS to define beamforming settings to transmit MU-MIMO transmissions to the K UEs, e.g., as described below. For example, device 102 may be configured to operate as, perform a role of, and/or perform one or more functionalities of, the BS; and/or device 140 may be configured to operate as, perform a role of, and/or perform one or more functionalities of, a UE of the K UEs, e.g., as described below.

In some demonstrative embodiments, during the Stage 1, the BS may operate the wide beams, e.g., HPBW=Δ, to transmit from the $N_b$ RF chains of the BS SS beamformed in $N_b$ directions, for example, by browsing over the full space with the first layer CB. For example, the BS may multiplex multiple beams in space and frequency, for example, according to the IFDM scheme, e.g., as described above.

In some demonstrative embodiments, during the Stage 1, each of the UEs may operate with wide receive beams, e.g., HPBW=Δ. For example, an i-th UE, wherein i=1, . . . , K, may measure the SNR for different directions, and may determine the best wide BS transmit sector, denoted (BS-$\psi_i)_\Delta$, and the best wide UE receive sector, denoted (UE-$\psi_i)_\Delta$, e.g., based on the received SS at the UE.

In some demonstrative embodiments, both ends, e.g., the BS and the UEs may employ directional beams during the Stage 1, e.g., as described above.

In some demonstrative embodiments, the BS may operate at a pseudo-omnidirectional receive state to receive feedback from the UEs, e.g., subsequent to performing the transmission of the SS via the wide beams.

In some demonstrative embodiments, the UEs may feedback to the BS the best wide BS transmit sector (BS-$\psi_i)_\Delta$ selected at stage-I. For example, the i-th UE may transmit the feedback to the BS with the wide beam in the best wide UE receive sector (UE-$\psi_i)_\Delta$ from stage-I.

In some demonstrative embodiments, during the Stage-II, the BS may operate the narrower beams, e.g., HPBW=δ, to transmit SS to the UEs, while the UEs may operate the narrower beams, e.g., HPBW=δ, to receive the SS from the BS, e.g., as described below.

In some demonstrative embodiments, the BS may transmit from the $N_b$ RF chains directional narrower beams corresponding to the best wide BS transmit sector (BS-$\psi_i)_\Delta$ selected at stage-I, e.g., for every i-th UE.

In some demonstrative embodiments, the BS may multiplex multiple beams for every UE in space and frequency, for example, according to the IFDM scheme, e.g., as described above.

In some demonstrative embodiments, the BS may multiplex beams for different UEs in space and time, e.g., as described above.

In some demonstrative embodiments, the UEs may operate to receive in the $N_u$ RF chains with directional narrower beams corresponding to the best wide UE receive sector (UE-$\psi_i)_\Delta$ selected at the stage-I.

In some demonstrative embodiments, both ends, e.g., the BS and the UEs may employ directional beams during the Stage 2, e.g., as described above.

In some demonstrative embodiments, during the Stage 2, each of the UEs may operate with narrow receive beams, e.g., HPBW=δ. For example, the i-th UE may measure the SNR for different directions, and may define the best narrow BS transmit sector, denoted (BS-$\psi_i)_\delta$, and the best narrow UE receive sector, denoted (UE-$\psi_i)_\delta$.

In some demonstrative embodiments, the BS may operate at a receive state using the sector (BS-$\psi_i)_\Delta$ corresponding to the i-th UE to receive feedback from the UEs, e.g., subsequent to performing the transmission of the SS via the narrow beams.

In some demonstrative embodiments, the UEs may feedback to the BS the best narrow BS transmit sector (BS-$\psi_i)_\delta$ selected at stage-II. For example, the i-th UE may transmit the feedback to the BS with the narrow beam in the best narrow UE receive sector (UE-$\psi_i)_\delta$ from stage-II.

The following Table includes an example of a comparison between acquisition times of the Stage I and the Stage II of the hybrid beamforming training scheme described above, in accordance with some demonstrative embodiment, and acquisition times of an exhaustive beamforming scheme, and a beamforming scheme utilizing a conventional sector sweep:

TABLE 1

| Exhaustive/ Directional both ends | Conventional sector sweep (Transmit and (receive training) | Stage I/Hybrid beamforming | Stage II/Hybrid beamforming |
|---|---|---|---|
| $L^2$ | $4L$ | $\text{Ceil}\left(\frac{L}{N_T \cdot n}\right) \cdot \text{Ceil}\left(\frac{L}{N_R \cdot n}\right)$ | $\text{Ceil}\left(\frac{L}{N_T}\right) \cdot \text{Ceil}\left(\frac{L}{N_R}\right)$ |

For example, L denotes the number of codewords to generate the narrow beams with HPBW=δ, $$n = \frac{\Delta}{\delta},$$

and Ceil(.) denotes a ceiling function to map (.) to a smallest following integer.

The following Table includes an example of the acquisition times of the Table 1, for example, when the number of transmit beams $N_T$=8, the number of receive beams $N_R$=2, n=8, and L=120:

TABLE 2

| Exhaustive/ Directional both ends | Conventional sector sweep (Transmit and receive training) | Stage I/Hybrid beamforming | Stage II/Hybrid beamforming |
|---|---|---|---|
| 14400 | 480 | 16 | 4 |

As can be seen from Tables 1 and 2, the hybrid beamforming training scheme described herein may provide substantial improvement, for example, at least with respect to the acquisition time.

In some demonstrative embodiments, the plurality of UEs may be distributed in g wide sectors, and accordingly, for example, the number of reported sectors at the stage-I may be g>1. Accordingly, a number of symbols for acquisition in the stage-2 maybe multiplied by g (1≤g≤L/n).

In contrast, a number of symbols for a conventional transmit/receive sector sweep may increase in a multiuser case with k users, for example, according to 240+k*240.

For example, according to Table 2, (1≤g≤15), for g=4, the total acquisition time may be 32 symbols, which is substantially less than the total acquisition time in the conventional schemes.

In some demonstrative embodiments, controller 124 may be configured to cause, trigger and/or control a first wireless station implemented by device 102 to perform hybrid beamforming training with one or more second wireless stations, e.g., including a wireless station implemented by device 140, e.g., as described below.

In some demonstrative embodiments, controller 124 may be configured to cause, trigger and/or control the first wireless station to, during first hybrid beamforming training, e.g., during the hybrid beamforming stage 1, simultaneously transmit, via a plurality of RF chains of the first wireless station, e.g., RF chains 109, a first plurality of spatially multiplexed Synchronization Signals (SS) beamformed in a plurality of wide beam directions, e.g., as described above.

In some demonstrative embodiments, controller 124 may be configured to cause, trigger and/or control the first wireless station to process one or more first feedback messages from the one or more second wireless stations, to identify one or more reported wide beam directions of the plurality of wide beam directions. For example, controller 124 may be configured to cause, trigger and/or control the first wireless station to process a feedback from an i-th UE including the indication of the best wide BS transmit sector (BS–$\psi_i$)$_\Delta$, e.g., as described above.

In some demonstrative embodiments, controller 124 may be configured to cause, trigger and/or control the first wireless station to during a second hybrid beamforming training, e.g., during the hybrid beamforming state 2, simultaneously transmit, via the plurality of RF chains of the first wireless station, e.g., RF chains 109, a second plurality of spatially multiplexed SS beamformed in a plurality of narrow beam directions, which correspond to, e.g., which are included in, associated with, and/or covered by, the one or more reported wide beam directions. For example, controller 124 may be configured to cause, trigger and/or control the first wireless station to transmit to the i-th UE directional narrower beams corresponding to the best wide BS transmit sector (BS–$\psi_i$)$_\Delta$ reported by the i-th UE, e.g., as described above.

In some demonstrative embodiments, controller 124 may be configured to cause, trigger and/or control the first wireless station to process one or more second feedback messages from the one or more second wireless stations, to identify one or more reported narrow beam directions of the plurality of narrow beam directions. For example, controller 124 may be configured to cause, trigger and/or control the first wireless station to process a feedback from the i-th UE including the indication of the best narrow BS transmit sector (BS–$\psi_i$)$_\delta$, e.g., as described above.

In some demonstrative embodiments, controller 124 may be configured to cause, trigger and/or control the first wireless station to transmit to the one or more second stations according to a beamforming scheme based on the reported narrow beam directions. For example, controller 124 may be configured to cause, trigger and/or control the first wireless station to transmit a MU MIMO transmission to the second wireless stations, for example, using the one or more narrow BS transmit sector (BS–$\psi_i$)$_\delta$ reported by the second wireless stations, e.g., as described above.

In some demonstrative embodiments, controller 124 may be configured to cause, trigger and/or control the first wireless station to modulate the first and second pluralities of SS according to SC modulation scheme, e.g., as described above.

In some demonstrative embodiments, controller 124 may be configured to cause, trigger and/or control the first wireless station to multiplex, according to a spatial-frequency multiplexing scheme, the first plurality of SS over the plurality of wide beam directions, and the second plurality of SS over the plurality of narrow beam directions, e.g., as described above. For example, the spatial-frequency multiplexing scheme may include an IFDM scheme, e.g., as described above.

In some demonstrative embodiments, controller 124 may be configured to cause, trigger and/or control the first wireless station to modulate the first and second pluralities of SS according to an OFDM scheme or any other modulations scheme, e.g., as described above.

In some demonstrative embodiments, controller 124 may be configured to cause, trigger and/or control the first wireless station to perform RF beamforming in the plurality of wide beam directions according to beamforming vectors defined according to a first codebook, e.g., the CB-1, including a first plurality of code-words, to select a plurality of second codebooks, e.g., CB-2, based on the plurality of reported wide beam directions, and to perform RF beamforming in the plurality of narrow beam directions according beamforming vectors defined according to a second plurality of code-words included in the plurality of second codebooks, e.g., as described above.

In some demonstrative embodiments, controller 124 may be configured to cause, trigger and/or control the first wireless station to digitally process the simultaneous transmission of the first plurality of SS via the plurality of RF chains, and the simultaneous transmission of the second plurality of SS via the plurality of RF chains, e.g., as described above.

In some demonstrative embodiments, controller 124 may be configured to cause, trigger and/or control the first wireless station to digitally process transmission via the plurality of RF chains according to an MAA architecture, which associates the plurality of RF chains with a respective plurality of different antenna element sets, e.g., as described above.

In some demonstrative embodiments, controller 124 may be configured to cause, trigger and/or control the first wireless station to digitally process transmission via the plurality of RF chains according to an FAA architecture, which associates each RF chain of the plurality of RF chains with the same plurality of antenna elements, e.g., as described above.

In some demonstrative embodiments, controller 124 may be configured to cause, trigger and/or control the first wireless station to repeat the second hybrid beamforming training, for example, to update the beamforming scheme within the reported wide beam directions, e.g., as described above.

In some demonstrative embodiments, controller 154 may be configured to cause, trigger and/or control a first wireless station implemented by device 140 to perform hybrid beamforming training with a second wireless station, e.g., the wireless station implemented by device 102, e.g., as described below.

In some demonstrative embodiments, controller 154 may be configured to cause, trigger and/or control the first wireless station to during first hybrid beamforming training, e.g., during the hybrid beamforming stage 1, simultaneously process, via a plurality of RF chains of the first wireless station, e.g., RF chains 149, reception of one or more first spatially multiplexed SS from the second wireless station over a plurality of wide beam directions, e.g., as described above.

In some demonstrative embodiments, controller 154 may be configured to cause, trigger and/or control the first wireless station to select a reported wide beam direction of the plurality of wide beam directions, based on the one or more first SS. For example, in some demonstrative embodiments, controller 154 may be configured to select the best wide BS transmit sector (BS–$\psi_i$)$_\Delta$ corresponding to the first wireless station, e.g., as described above.

In some demonstrative embodiments, controller 154 may be configured to cause, trigger and/or control the first wireless station to transmit to the second wireless station a first feedback message to identify the reported wide beam direction. For example, In some demonstrative embodiments, controller 154 may be configured to cause, trigger and/or control the first wireless station to transmit a feedback message indicating the best wide BS transmit sector (BS–$\psi_i$)$_\Delta$, for example, via the best wide UE receive sector (UE–$\psi_i$)$_\Delta$, e.g., as described above.

In some demonstrative embodiments, controller 154 may be configured to cause, trigger and/or control the first wireless station to, during a second hybrid beamforming training, e.g., during the hybrid beamforming training stage 2, simultaneously process, via the plurality of RF chains of the first wireless station, reception of one or more second spatially multiplexed SS from the second wireless station over a plurality of narrow beam directions, correspond to, e.g., which are included in, associated with, and/or covered by, the reported wide beam direction. For example, controller 154 may be configured to cause, trigger and/or control the first wireless station to process reception of the second SS via the plurality of directional narrow beams corresponding to the best wide UE receive sector $(UE-\psi_i)_\Delta$ selected by the first wireless station at the first beamforming training, e.g., as described above.

In some demonstrative embodiments, controller 154 may be configured to cause, trigger and/or control the first wireless station to select a reported narrow beam direction of the plurality of narrow beam directions, based on the one or more second SS. For example, In some demonstrative embodiments, controller 154 may be configured to select the best narrow BS transmit sector $(BS-\psi_i)_\delta$ corresponding to the first wireless station, e.g., as described above.

In some demonstrative embodiments, controller 154 may be configured to cause, trigger and/or control the first wireless station to transmit to the second wireless station a second feedback message to identify the reported narrow beam direction. For example, In some demonstrative embodiments, controller 154 may be configured to cause, trigger and/or control the first wireless station to transmit a feedback message indicating the best narrow BS transmit sector $(BS-\psi_i)_\delta$, for example, via the best narrow UE receive sector $(UE-\psi_i)_\delta$, e.g., as described above.

In some demonstrative embodiments, controller 154 may be configured to cause, trigger and/or control the first wireless station to process the first and second SS according to a SC modulation scheme, e.g., as described above.

In some demonstrative embodiments, controller 154 may be configured to cause, trigger and/or control the first wireless station to process the first and second SS according to a spatial-frequency multiplexing scheme. For example, controller 154 may be configured to cause, trigger and/or control the first wireless station to process the first and second SS according to an IFDM scheme, e.g., as described above.

In some demonstrative embodiments, controller 154 may be configured to cause, trigger and/or control the first wireless station to process the first and second SS according to an OFDM scheme or any other modulation scheme, e.g., as described above.

In some demonstrative embodiments, controller 154 may be configured to cause, trigger and/or control the first wireless station to perform RF beamforming in the plurality of wide beam directions according to beamforming vectors defined according to a first codebook, e.g., the CB-1 (also referred to as "Tier-1 CB"), including a first plurality of code-words.

In some demonstrative embodiments, controller 154 may be configured to cause, trigger and/or control the first wireless station to select a second codebook, e.g., the CB-2 (also referred to as "Tier-2 CB"), based on the reported wide beam direction. For example, the second codebook may include a CB-2 ("Tier-1 specific Tier 2 codebook") corresponding to the reported wide beam direction.

In some demonstrative embodiments, controller 154 may be configured to perform RF beamforming in the plurality of narrow beam directions according beamforming vectors defined according to a second plurality of code-words defined by the second codebook, e.g., as described above.

In some demonstrative embodiments, controller 154 may be configured to cause, trigger and/or control the first wireless station to digitally process the simultaneous reception of the one or more first SS via the plurality of RF chains, and the simultaneous reception of the one or more second SS via the plurality of RF chains, e.g., as described above.

In some demonstrative embodiments, controller 154 may be configured to cause, trigger and/or control the first wireless station to digitally process reception via the plurality of RF chains according to an MAA architecture, which associates the plurality of RF chains with a respective plurality of different antenna element sets, e.g., as described above.

In some demonstrative embodiments, controller 154 may be configured to cause, trigger and/or control the first wireless station to digitally process reception via the plurality of RF chains according to an FAA architecture, which associates each RF chain of the plurality of RF chains with the same plurality of antenna elements, e.g., as described above.

In some demonstrative embodiments, controller 154 may be configured to cause, trigger and/or control the first wireless station to repeat the second hybrid beamforming training, e.g., as described above.

Figure 8:
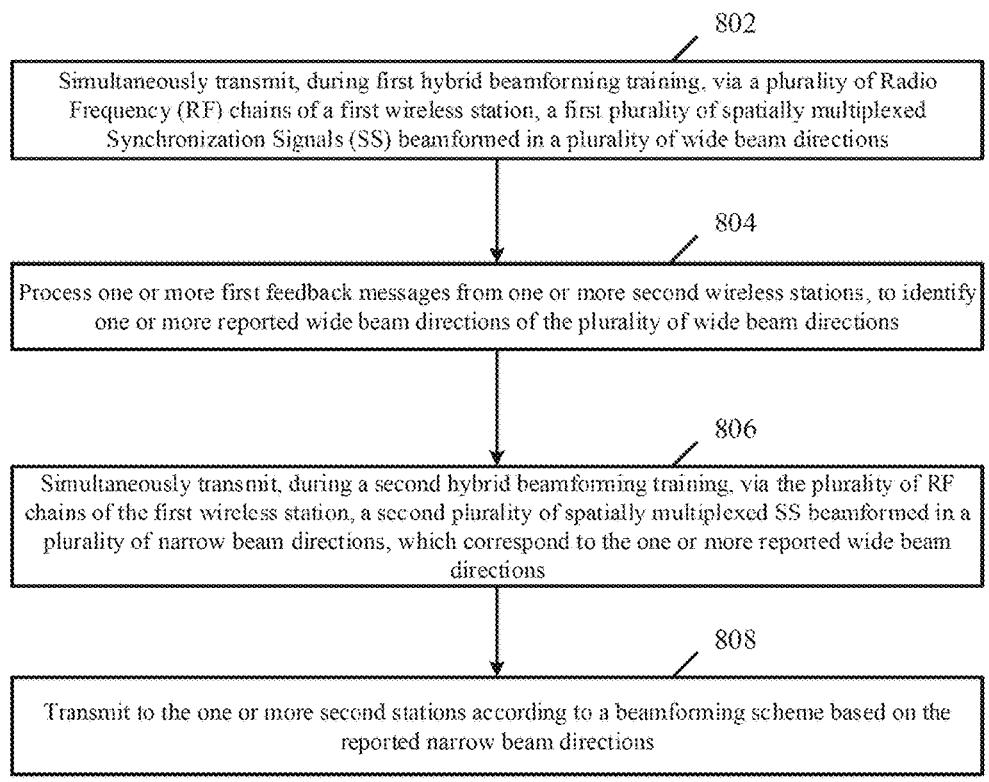
FIG. 8 is a schematic flow-chart illustration of a method of hybrid beamforming training, in accordance with some demonstrative embodiments.

Reference is made to FIG. 8, which schematically illustrates a method of hybrid beamforming training, in accordance with some demonstrative embodiments. For example, one or more of the operations of the method of FIG. 8 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 802, the method may include simultaneously transmitting, during first hybrid beamforming training, via a plurality of Radio Frequency (RF) chains of a first wireless station, a first plurality of spatially multiplexed Synchronization Signals (SS) beamformed in a plurality of wide beam directions. For example, controller 124 (FIG. 1) may be configured to cause, trigger, and/or control the wireless station implemented by device 102 (FIG. 1) to simultaneously transmit the first plurality of SS during the first beamforming training, e.g., as described above.

As indicated at block 804, the method may include processing one or more first feedback messages from one or more second wireless stations, to identify one or more reported wide beam directions of the plurality of wide beam directions. For example, controller 124 (FIG. 1) may be configured to cause, trigger, and/or control the wireless station implemented by device 102 (FIG. 1) to process feedback messages indicating one or more wide beam directions from one or more UEs, e.g., as described above.

As indicated at block 806, the method may include simultaneously transmitting, during a second hybrid beamforming training, via the plurality of RF chains of the first wireless station, a second plurality of spatially multiplexed SS beamformed in a plurality of narrow beam directions, which correspond to, e.g., which are included in, associated with, and/or covered by, the one or more reported wide beam directions. For example, controller 124 (FIG. 1) may be configured to cause, trigger, and/or control the wireless station implemented by device 102 (FIG. 1) to simultaneously transmit the second plurality of SS during the first beamforming training, e.g., as described above.

As indicated at block 808, the method may include transmitting to the one or more second stations according to a beamforming scheme based on the reported narrow beam directions. For example, controller 124 (FIG. 1) may be configured to cause, trigger, and/or control the wireless station implemented by device 102 (FIG. 1) to transmit a MU MIMO transmission to a plurality of UEs based on one or more reported narrow beams from the plurality of UEs, e.g., as described above.

Figure 9:
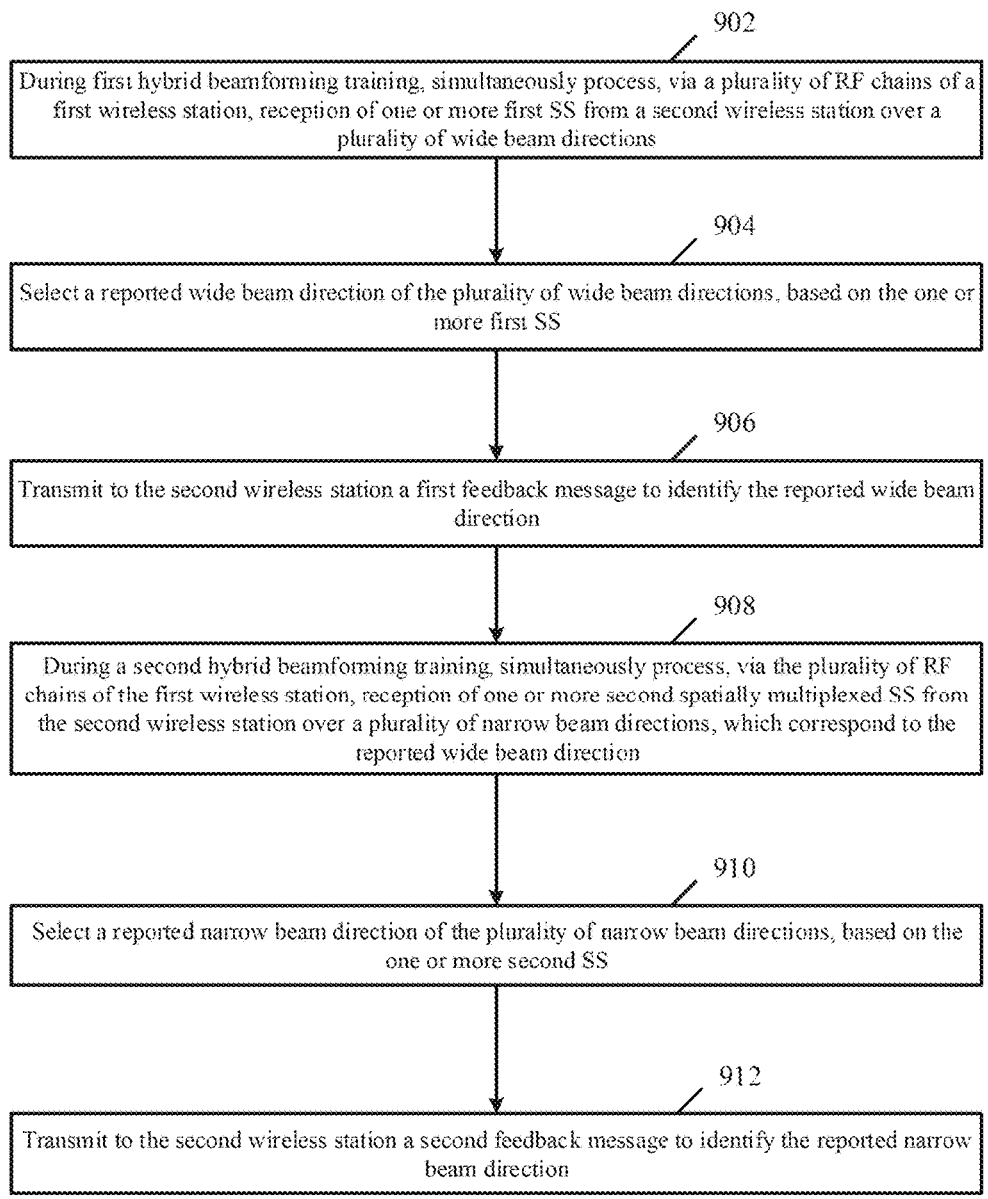
FIG. 9 is a schematic flow-chart illustration of a method of hybrid beamforming training, in accordance with some demonstrative embodiments.

Reference is made to FIG. 9, which schematically illustrates a method of hybrid beamforming training, in accordance with some demonstrative embodiments. For example, one or more of the operations of the method of FIG. 9 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 902, the method may include, during first hybrid beamforming training, simultaneously processing, via a plurality of RF chains of a first wireless station, reception of one or more first SS from a second wireless station over a plurality of wide beam directions. For example, controller 154 (FIG. 1) may be configured to cause, trigger, and/or control the wireless station implemented by device 140 (FIG. 1) to receive the SS from device 102 (FIG. 1) via a plurality of wide beam directions, e.g., as described above.

As indicated at block 904, the method may include selecting a reported wide beam direction of the plurality of wide beam directions, based on the one or more first SS. For example, controller 154 (FIG. 1) may be configured to cause, trigger, and/or control the wireless station implemented by device 140 (FIG. 1) to select a best wide beam direction based on the received SS, e.g., as described above.

As indicated at block 906, the method may include transmitting to the second wireless station a first feedback message to identify the reported wide beam direction. For example, controller 154 (FIG. 1) may be configured to cause, trigger, and/or control the wireless station implemented by device 140 (FIG. 1) to transmit to device 102 (FIG. 1) a feedback message indicating the selected wide beam direction, e.g., as described above.

As indicated at block 908, the method may include, during a second hybrid beamforming training, simultaneously processing, via the plurality of RF chains of the first wireless station, reception of one or more second spatially multiplexed SS from the second wireless station over a plurality of narrow beam directions, which correspond to, e.g., which are included in, associated with, and/or covered by, the reported wide beam direction. For example, controller 154 (FIG. 1) may be configured to cause, trigger, and/or control the wireless station implemented by device 140 (FIG. 1) to receive the SS from device 102 (FIG. 1) via a plurality of narrow beam directions, which are included in the selected wide beam direction, e.g., as described above.

As indicated at block 910, the method may include selecting a reported narrow beam direction of the plurality of narrow beam directions, based on the one or more second SS. For example, controller 154 (FIG. 1) may be configured to cause, trigger, and/or control the wireless station implemented by device 140 (FIG. 1) to select a best narrow beam direction based on the received SS, e.g., as described above.

As indicated at block 912, the method may include transmitting to the second wireless station a second feedback message to identify the reported narrow beam direction. For example, controller 154 (FIG. 1) may be configured to cause, trigger, and/or control the wireless station implemented by device 140 (FIG. 1) to transmit to device 102 (FIG. 1) a feedback message indicating the selected narrow beam direction, e.g., as described above.

Figure 10:
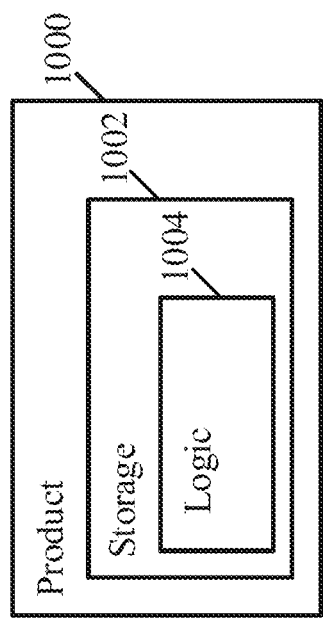
FIG. 10 is a schematic illustration of a product of manufacture, in accordance with some demonstrative embodiments.

Reference is made to FIG. 10, which schematically illustrates a product of manufacture 1000, in accordance with some demonstrative embodiments. Product 1000 may include one or more tangible computer-readable non-transitory storage media 1002, which may include computer-executable instructions, e.g., implemented by logic 1004, operable to, when executed by at least one computer processor, enable the at least one computer processor to implement one or more operations at devices 102 and/or 140 (FIG. 1), transmitters 118 and/or 148 (FIG. 1), receivers 116 and/or 146 (FIG. 1), controllers 124 and/or 154 (FIG. 1), message processors 128 (FIG. 1) and/or 158 (FIG. 1), and/or to perform, trigger and/or implement one or more operations and/or functionalities, for example, one or more operations and/or functionalities described above with reference to FIGS. 1, 2, 3, 4, 5, 6, 7, 8, and/or 9, and/or one or more operations and/or functionalities described herein. The phrase "non-transitory machine-readable medium" is directed to include all computer-readable media, with the sole exception being a transitory propagating signal.

In some demonstrative embodiments, product 1000 and/or machine-readable storage medium 1002 may include one or more types of computer-readable storage media capable of storing data, including volatile memory, non-volatile memory, removable or non-removable memory, erasable or non-erasable memory, writeable or re-writeable memory, and the like. For example, machine-readable storage medium 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry and logic configured to cause a first wireless station to, during first hybrid beamforming training, simultaneously transmit, via a plurality of Radio Frequency (RF) chains of the first wireless station, a first plurality of spatially multiplexed Synchronization Signals (SS) beamformed in a plurality of wide beam directions; process one or more first feedback messages from one or more second wireless stations, to identify one or more reported wide beam directions of the plurality of wide beam directions; during a second hybrid beamforming training, simultaneously transmit, via the plurality of RF chains of the first wireless station, a second plurality of spatially multiplexed SS beamformed in a plurality of narrow beam directions, which correspond to the one or more reported wide beam directions; process one or more second feedback messages from the one or more second wireless stations, to identify one or more reported narrow beam directions of the plurality of narrow beam directions; and transmit to the one or more second stations according to a beamforming scheme based on the reported narrow beam directions.

Example 2 includes the subject matter of Example 1, and optionally, wherein the apparatus is configured to cause the first wireless station to modulate the first and second pluralities of SS according to a Single-Carrier (SC) modulation scheme.

Example 3 includes the subject matter of Example 2, and optionally, wherein the apparatus is configured to cause the first wireless station to multiplex, according to a spatial-frequency multiplexing scheme, the first plurality of SS over the plurality of wide beam directions, and the second plurality of SS over the plurality of narrow beam directions.

Example 4 includes the subject matter of Example 3, and optionally, wherein the spatial-frequency multiplexing scheme comprises an Interleaved Frequency Division Multiplexing (IFDM) scheme.

Example 5 includes the subject matter of Example 1, and optionally, wherein the apparatus is configured to cause the first wireless station to modulate the first and second pluralities of SS according to an Orthogonal Frequency Division Multiplexing (OFDM) scheme.

Example 6 includes the subject matter of any one of Examples 1-5, and optionally, wherein the apparatus is configured to cause the first wireless station to perform RF beamforming in the plurality of wide beam directions according to beamforming vectors defined according to a first codebook comprising a first plurality of code-words, to select a plurality of second codebooks based on the plurality of reported wide beam directions, and to perform RF beamforming in the plurality of narrow beam directions according beamforming vectors defined according to a second plurality of code-words included in the plurality of second codebooks.

Example 7 includes the subject matter of any one of Examples 1-6, and optionally, wherein the apparatus is configured to cause the first wireless station to digitally process the simultaneous transmission of the first plurality of SS via the plurality of RF chains, and the simultaneous transmission of the second plurality of SS via the plurality of RF chains.

Example 8 includes the subject matter of Example 7, and optionally, wherein the apparatus is configured to cause the first wireless station to digitally process transmission via the plurality of RF chains according to a Modular Antenna Array (MAA) architecture, which associates the plurality of RF chains with a respective plurality of different antenna element sets.

Example 9 includes the subject matter of Example 7, and optionally, wherein the apparatus is configured to cause the first wireless station to digitally process transmission via the plurality of RF chains according to a Fully Adaptive Antenna Array (FAA) architecture, which associates each RF chain of the plurality of RF chains with the same plurality of antenna elements.

Example 10 includes the subject matter of any one of Examples 1-9, and optionally, wherein the apparatus is configured to cause the first wireless station to repeat the second hybrid beamforming training to update the beamforming scheme within the reported wide beam directions.

Example 11 includes the subject matter of any one of Examples 1-10, and optionally, wherein the one or more second wireless stations comprise a plurality of second wireless stations, the beamforming scheme comprising a Multi-User (MU) Multiple-Input-Multiple-Output (MIMO) beamforming scheme.

Example 12 includes the subject matter of any one of Examples 1-11, and optionally, wherein the first wireless station is a Base Station to communicate with one or more User Equipment (UE).

Example 13 includes the subject matter of any one of Examples 1-12, and optionally, comprising a digital processor, and the plurality of RF chains.

Example 14 includes the subject matter of any one of Examples 1-13, and optionally, comprising a memory and a plurality of antennas.

Example 15 includes a system of wireless communication comprising a first wireless station, the first wireless station comprising a plurality of antennas; a plurality of Radio Frequency (RF) chains; a memory; a controller configured to cause the first wireless station to, during first hybrid beamforming training, simultaneously transmit, via the plurality of RF chains of the first wireless station, a first plurality of spatially multiplexed Synchronization Signals (SS) beamformed in a plurality of wide beam directions; process one or more first feedback messages from one or more second wireless stations, to identify one or more reported wide beam directions of the plurality of wide beam directions; during a second hybrid beamforming training, simultaneously transmit, via the plurality of RF chains of the first wireless station, a second plurality of spatially multiplexed SS beamformed in a plurality of narrow beam directions, which correspond to the one or more reported wide beam directions; process one or more second feedback messages from the one or more second wireless stations, to identify one or more reported narrow beam directions of the plurality of narrow beam directions; and transmit to the one or more second stations according to a beamforming scheme based on the reported narrow beam directions.

Example 16 includes the subject matter of Example 15, and optionally, wherein the controller is configured to cause the first wireless station to modulate the first and second pluralities of SS according to a Single-Carrier (SC) modulation scheme.

Example 17 includes the subject matter of Example 16, and optionally, wherein the controller is configured to cause the first wireless station to multiplex, according to a spatial-frequency multiplexing scheme, the first plurality of SS over the plurality of wide beam directions, and the second plurality of SS over the plurality of narrow beam directions.

Example 18 includes the subject matter of Example 17, and optionally, wherein the spatial-frequency multiplexing scheme comprises an Interleaved Frequency Division Multiplexing (IFDM) scheme.

Example 19 includes the subject matter of Example 15, and optionally, wherein the controller is configured to cause the first wireless station to modulate the first and second pluralities of SS according to an Orthogonal Frequency Division Multiplexing (OFDM) scheme.

Example 20 includes the subject matter of any one of Examples 15-19, and optionally, wherein the controller is configured to cause the first wireless station to perform RF beamforming in the plurality of wide beam directions according to beamforming vectors defined according to a first codebook comprising a first plurality of code-words, to select a plurality of second codebooks based on the plurality of reported wide beam directions, and to perform RF beamforming in the plurality of narrow beam directions according beamforming vectors defined according to a second plurality of code-words included in the plurality of second codebooks.

Example 21 includes the subject matter of any one of Examples 15-20, and optionally, wherein the controller is configured to cause the first wireless station to digitally process the simultaneous transmission of the first plurality of SS via the plurality of RF chains, and the simultaneous transmission of the second plurality of SS via the plurality of RF chains.

Example 22 includes the subject matter of Example 21, and optionally, wherein the controller is configured to cause the first wireless station to digitally process transmission via the plurality of RF chains according to a Modular Antenna Array (MAA) architecture, which associates the plurality of RF chains with a respective plurality of different antenna element sets.

Example 23 includes the subject matter of Example 21, and optionally, wherein the controller is configured to cause the first wireless station to digitally process transmission via the plurality of RF chains according to a Fully Adaptive Antenna Array (FAA) architecture, which associates each RF chain of the plurality of RF chains with the same plurality of antenna elements.

Example 24 includes the subject matter of any one of Examples 15-23, and optionally, wherein the controller is configured to cause the first wireless station to repeat the second hybrid beamforming training to update the beamforming scheme within the reported wide beam directions.

Example 25 includes the subject matter of any one of Examples 15-24, and optionally, wherein the one or more second wireless stations comprise a plurality of second wireless stations, the beamforming scheme comprising a Multi-User (MU) Multiple-Input-Multiple-Output (MIMO) beamforming scheme.

Example 26 includes the subject matter of any one of Examples 15-25, and optionally, wherein the first wireless station is a Base Station to communicate with one or more User Equipment (UE).

Example 27 includes a method to be performed at a first wireless station, the method comprising during first hybrid beamforming training, simultaneously transmitting, via a plurality of Radio Frequency (RF) chains of the first wireless station, a first plurality of spatially multiplexed Synchronization Signals (SS) beamformed in a plurality of wide beam directions; processing one or more first feedback messages from one or more second wireless stations, to identify one or more reported wide beam directions of the plurality of wide beam directions; during a second hybrid beamforming training, simultaneously transmitting, via the plurality of RF chains of the first wireless station, a second plurality of spatially multiplexed SS beamformed in a plurality of narrow beam directions, which correspond to the one or more reported wide beam directions; processing one or more second feedback messages from the one or more second wireless stations, to identify one or more reported narrow beam directions of the plurality of narrow beam directions; and transmitting to the one or more second stations according to a beamforming scheme based on the reported narrow beam directions.

Example 28 includes the subject matter of Example 27, and optionally, comprising modulating the first and second pluralities of SS according to a Single-Carrier (SC) modulation scheme.

Example 29 includes the subject matter of Example 28, and optionally, comprising multiplexing, according to a spatial-frequency multiplexing scheme, the first plurality of SS over the plurality of wide beam directions, and the second plurality of SS over the plurality of narrow beam directions.

Example 30 includes the subject matter of Example 29, and optionally, wherein the spatial-frequency multiplexing scheme comprises an Interleaved Frequency Division Multiplexing (IFDM) scheme.

Example 31 includes the subject matter of Example 27, and optionally, comprising modulating the first and second pluralities of SS according to an Orthogonal Frequency Division Multiplexing (OFDM) scheme.

Example 32 includes the subject matter of any one of Examples 27-31, and optionally, comprising performing RF beamforming in the plurality of wide beam directions according to beamforming vectors defined according to a first codebook comprising a first plurality of code-words, selecting a plurality of second codebooks based on the plurality of reported wide beam directions, and performing RF beamforming in the plurality of narrow beam directions according beamforming vectors defined according to a second plurality of code-words included in the plurality of second codebooks.

Example 33 includes the subject matter of any one of Examples 27-32, and optionally, comprising digitally processing the simultaneous transmission of the first plurality of SS via the plurality of RF chains, and the simultaneous transmission of the second plurality of SS via the plurality of RF chains.

Example 34 includes the subject matter of Example 33, and optionally, comprising digitally processing transmission via the plurality of RF chains according to a Modular Antenna Array (MAA) architecture, which associates the plurality of RF chains with a respective plurality of different antenna element sets.

Example 35 includes the subject matter of Example 33, and optionally, comprising digitally processing transmission via the plurality of RF chains according to a Fully Adaptive Antenna Array (FAA) architecture, which associates each RF chain of the plurality of RF chains with the same plurality of antenna elements.

Example 36 includes the subject matter of any one of Examples 27-35, and optionally, comprising repeating the second hybrid beamforming training to update the beamforming scheme within the reported wide beam directions.

Example 37 includes the subject matter of any one of Examples 27-36, and optionally, wherein the one or more second wireless stations comprise a plurality of second wireless stations, the beamforming scheme comprising a Multi-User (MU) Multiple-Input-Multiple-Output (MIMO) beamforming scheme.

Example 38 includes the subject matter of any one of Examples 27-37, and optionally, wherein the first wireless station is a Base Station to communicate with one or more User Equipment (UE).

Example 39 includes a product comprising one or more tangible computer-readable non-transitory storage media comprising computer-executable instructions operable to, when executed by at least one computer processor, enable the at least one computer processor to implement operations at a first wireless station, the operations comprising, during first hybrid beamforming training, simultaneously transmitting, via a plurality of Radio Frequency (RF) chains of the first wireless station, a first plurality of spatially multiplexed Synchronization Signals (SS) beamformed in a plurality of wide beam directions; processing one or more first feedback messages from one or more second wireless stations, to identify one or more reported wide beam directions of the plurality of wide beam directions; during a second hybrid beamforming training, simultaneously transmitting, via the plurality of RF chains of the first wireless station, a second plurality of spatially multiplexed SS beamformed in a plurality of narrow beam directions, which correspond to the one or more reported wide beam directions; processing one or more second feedback messages from the one or more second wireless stations, to identify one or more reported narrow beam directions of the plurality of narrow beam directions; and transmitting to the one or more second stations according to a beamforming scheme based on the reported narrow beam directions.

Example 40 includes the subject matter of Example 39, and optionally, wherein the operations comprise modulating the first and second pluralities of SS according to a Single-Carrier (SC) modulation scheme.

Example 41 includes the subject matter of Example 40, and optionally, wherein the operations comprise multiplexing, according to a spatial-frequency multiplexing scheme, the first plurality of SS over the plurality of wide beam directions, and the second plurality of SS over the plurality of narrow beam directions.

Example 42 includes the subject matter of Example 41, and optionally, wherein the spatial-frequency multiplexing scheme comprises an Interleaved Frequency Division Multiplexing (IFDM) scheme.

Example 43 includes the subject matter of Example 39, and optionally, wherein the operations comprise modulating the first and second pluralities of SS according to an Orthogonal Frequency Division Multiplexing (OFDM) scheme.

Example 44 includes the subject matter of any one of Examples 39-43, and optionally, wherein the operations comprise performing RF beamforming in the plurality of wide beam directions according to beamforming vectors defined according to a first codebook comprising a first plurality of code-words, selecting a plurality of second codebooks based on the plurality of reported wide beam directions, and performing RF beamforming in the plurality of narrow beam directions according beamforming vectors defined according to a second plurality of code-words included in the plurality of second codebooks.

Example 45 includes the subject matter of any one of Examples 39-44, and optionally, wherein the operations comprise digitally processing the simultaneous transmission of the first plurality of SS via the plurality of RF chains, and the simultaneous transmission of the second plurality of SS via the plurality of RF chains.

Example 46 includes the subject matter of Example 45, and optionally, wherein the operations comprise digitally processing transmission via the plurality of RF chains according to a Modular Antenna Array (MAA) architecture, which associates the plurality of RF chains with a respective plurality of different antenna element sets.

Example 47 includes the subject matter of Example 45, and optionally, wherein the operations comprise digitally processing transmission via the plurality of RF chains according to a Fully Adaptive Antenna Array (FAA) architecture, which associates each RF chain of the plurality of RF chains with the same plurality of antenna elements.

Example 48 includes the subject matter of any one of Examples 39-47, and optionally, wherein the operations comprise repeating the second hybrid beamforming training to update the beamforming scheme within the reported wide beam directions.

Example 49 includes the subject matter of any one of Examples 39-48, and optionally, wherein the one or more second wireless stations comprise a plurality of second wireless stations, the beamforming scheme comprising a Multi-User (MU) Multiple-Input-Multiple-Output (MIMO) beamforming scheme.

Example 50 includes the subject matter of any one of Examples 39-49, and optionally, wherein the first wireless station is a Base Station to communicate with one or more User Equipment (UE).

Example 51 includes an apparatus of wireless communication by a first wireless station, the apparatus comprising means for, during first hybrid beamforming training, simultaneously transmitting, via a plurality of Radio Frequency (RF) chains of the first wireless station, a first plurality of spatially multiplexed Synchronization Signals (SS) beamformed in a plurality of wide beam directions; means for processing one or more first feedback messages from one or more second wireless stations, to identify one or more reported wide beam directions of the plurality of wide beam directions; means for, during a second hybrid beamforming training, simultaneously transmitting, via the plurality of RF chains of the first wireless station, a second plurality of spatially multiplexed SS beamformed in a plurality of narrow beam directions, which correspond to the one or more reported wide beam directions; means for processing one or more second feedback messages from the one or more second wireless stations, to identify one or more reported narrow beam directions of the plurality of narrow beam directions; and means for transmitting to the one or more second stations according to a beamforming scheme based on the reported narrow beam directions.

Example 52 includes the subject matter of Example 51, and optionally, comprising means for modulating the first and second pluralities of SS according to a Single-Carrier (SC) modulation scheme.

Example 53 includes the subject matter of Example 52, and optionally, comprising means for multiplexing, according to a spatial-frequency multiplexing scheme, the first plurality of SS over the plurality of wide beam directions, and the second plurality of SS over the plurality of narrow beam directions.

Example 54 includes the subject matter of Example 53, and optionally, wherein the spatial-frequency multiplexing scheme comprises an Interleaved Frequency Division Multiplexing (IFDM) scheme.

Example 55 includes the subject matter of Example 51, and optionally, comprising means for modulating the first and second pluralities of SS according to an Orthogonal Frequency Division Multiplexing (OFDM) scheme.

Example 56 includes the subject matter of any one of Examples 51-55, and optionally, comprising means for performing RF beamforming in the plurality of wide beam directions according to beamforming vectors defined according to a first codebook comprising a first plurality of code-words, selecting a plurality of second codebooks based on the plurality of reported wide beam directions, and performing RF beamforming in the plurality of narrow beam directions according beamforming vectors defined according to a second plurality of code-words included in the plurality of second codebooks.

Example 57 includes the subject matter of any one of Examples 51-56, and optionally, comprising means for digitally processing the simultaneous transmission of the first plurality of SS via the plurality of RF chains, and the simultaneous transmission of the second plurality of SS via the plurality of RF chains.

Example 58 includes the subject matter of Example 57, and optionally, comprising means for digitally processing transmission via the plurality of RF chains according to a Modular Antenna Array (MAA) architecture, which associates the plurality of RF chains with a respective plurality of different antenna element sets.

Example 59 includes the subject matter of Example 57, and optionally, comprising means for digitally processing transmission via the plurality of RF chains according to a Fully Adaptive Antenna Array (FAA) architecture, which associates each RF chain of the plurality of RF chains with the same plurality of antenna elements.

Example 60 includes the subject matter of any one of Examples 51-59, and optionally, comprising means for repeating the second hybrid beamforming training to update the beamforming scheme within the reported wide beam directions.

Example 61 includes the subject matter of any one of Examples 51-60, and optionally, wherein the one or more second wireless stations comprise a plurality of second wireless stations, the beamforming scheme comprising a Multi-User (MU) Multiple-Input-Multiple-Output (MIMO) beamforming scheme.

Example 62 includes the subject matter of any one of Examples 51-61, and optionally, wherein the first wireless station is a Base Station to communicate with one or more User Equipment (UE).

Example 63 includes an apparatus comprising circuitry and logic configured to cause a first wireless station to, during first hybrid beamforming training, simultaneously process, via a plurality of Radio Frequency (RF) chains of the first wireless station, reception of one or more first spatially multiplexed Synchronization Signals (SS) from a second wireless station over a plurality of wide beam directions; select a reported wide beam direction of the plurality of wide beam directions, based on the one or more first SS; transmit to the second wireless station a first feedback message to identify the reported wide beam direction; during a second hybrid beamforming training, simultaneously process, via the plurality of RF chains of the first wireless station, reception of one or more second spatially multiplexed SS from the second wireless station over a plurality of narrow beam directions, which correspond to the reported wide beam direction; select a reported narrow beam direction of the plurality of narrow beam directions, based on the one or more second SS; and transmit to the second wireless station a second feedback message to identify the reported narrow beam direction.

Example 64 includes the subject matter of Example 63, and optionally, wherein the apparatus is configured to cause the first wireless station to process the first and second SS according to a Single-Carrier (SC) modulation scheme.

Example 65 includes the subject matter of Example 64, and optionally, wherein the apparatus is configured to cause the first wireless station to process the first and second SS according to a spatial-frequency multiplexing scheme.

Example 66 includes the subject matter of Example 65, and optionally, wherein the spatial-frequency multiplexing scheme comprises an Interleaved Frequency Division Multiplexing (IFDM) scheme.

Example 67 includes the subject matter of Example 63, and optionally, wherein the apparatus is configured to cause the first wireless station to process the first and second SS according to an Orthogonal Frequency Division Multiplexing (OFDM) scheme.

Example 68 includes the subject matter of any one of Examples 63-67, and optionally, wherein the apparatus is configured to cause the first wireless station to perform RF beamforming in the plurality of wide beam directions according to beamforming vectors defined according to a first codebook comprising a first plurality of code-words, to select a second codebook based on the reported wide beam direction, and to perform RF beamforming in the plurality of narrow beam directions according beamforming vectors defined according to a second plurality of code-words included in the second codebook.

Example 69 includes the subject matter of any one of Examples 63-68, and optionally, wherein the apparatus is configured to cause the first wireless station to digitally process the simultaneous reception of the one or more first SS via the plurality of RF chains, and the simultaneous reception of the one or more second SS via the plurality of RF chains.

Example 70 includes the subject matter of Example 69, and optionally, wherein the apparatus is configured to cause the first wireless station to digitally process reception via the plurality of RF chains according to a Modular Antenna Array (MAA) architecture, which associates the plurality of RF chains with a respective plurality of different antenna element sets.

Example 71 includes the subject matter of Example 69, and optionally, wherein the apparatus is configured to cause the first wireless station to digitally process reception via the plurality of RF chains according to a Fully Adaptive Antenna Array (FAA) architecture, which associates each RF chain of the plurality of RF chains with the same plurality of antenna elements.

Example 72 includes the subject matter of any one of Examples 63-71, and optionally, wherein the apparatus is configured to cause the first wireless station to repeat the second hybrid beamforming training.

Example 73 includes the subject matter of any one of Examples 63-72, and optionally, wherein the beamforming scheme comprises a Multi-User (MU) Multiple-Input-Multiple-Output (MIMO) beamforming scheme.

Example 74 includes the subject matter of any one of Examples 63-73, and optionally, wherein the first wireless station is a User Equipment (UE).

Example 75 includes the subject matter of any one of Examples 63-74, and optionally, comprising a digital processor, and the plurality of RF chains.

Example 76 includes the subject matter of any one of Examples 63-75, and optionally, comprising a memory and a plurality of antennas.

Example 77 includes a system of wireless communication comprising a first wireless station, the first wireless station comprising a plurality of antennas; a plurality of Radio Frequency (RF) chains; a memory; and a controller configured to cause the first wireless station to, during first hybrid beamforming training, simultaneously process, via the plurality of RF chains of the first wireless station, reception of one or more first spatially multiplexed Synchronization Signals (SS) from a second wireless station over a plurality of wide beam directions; select a reported wide beam direction of the plurality of wide beam directions, based on the one or more first SS; transmit to the second wireless station a first feedback message to identify the reported wide beam direction; during a second hybrid beamforming training, simultaneously process, via the plurality of RF chains of the first wireless station, reception of one or more second spatially multiplexed SS from the second wireless station over a plurality of narrow beam directions, which correspond to the reported wide beam direction; select a reported narrow beam direction of the plurality of narrow beam directions, based on the one or more second SS; and transmit to the second wireless station a second feedback message to identify the reported narrow beam direction.

Example 78 includes the subject matter of Example 77, and optionally, wherein the controller is configured to cause the first wireless station to process the first and second SS according to a Single-Carrier (SC) modulation scheme.

Example 79 includes the subject matter of Example 78, and optionally, wherein the controller is configured to cause the first wireless station to process the first and second SS according to a spatial-frequency multiplexing scheme.

Example 80 includes the subject matter of Example 79, and optionally, wherein the spatial-frequency multiplexing scheme comprises an Interleaved Frequency Division Multiplexing (IFDM) scheme.

Example 81 includes the subject matter of Example 77, and optionally, wherein the controller is configured to cause the first wireless station to process the first and second SS according to an Orthogonal Frequency Division Multiplexing (OFDM) scheme.

Example 82 includes the subject matter of any one of Examples 77-81, and optionally, wherein the controller is configured to cause the first wireless station to perform RF beamforming in the plurality of wide beam directions according to beamforming vectors defined according to a first codebook comprising a first plurality of code-words, to select a second codebook based on the reported wide beam direction, and to perform RF beamforming in the plurality of narrow beam directions according beamforming vectors defined according to a second plurality of code-words included in the second codebook.

Example 83 includes the subject matter of any one of Examples 77-82, and optionally, wherein the controller is configured to cause the first wireless station to digitally process the simultaneous reception of the one or more first SS via the plurality of RF chains, and the simultaneous reception of the one or more second SS via the plurality of RF chains.

Example 84 includes the subject matter of Example 83, and optionally, wherein the controller is configured to cause the first wireless station to digitally process reception via the plurality of RF chains according to a Modular Antenna Array (MAA) architecture, which associates the plurality of RF chains with a respective plurality of different antenna element sets.

Example 85 includes the subject matter of Example 83, and optionally, wherein the controller is configured to cause the first wireless station to digitally process reception via the plurality of RF chains according to a Fully Adaptive Antenna Array (FAA) architecture, which associates each RF chain of the plurality of RF chains with the same plurality of antenna elements.

Example 86 includes the subject matter of any one of Examples 77-85, and optionally, wherein the controller is configured to cause the first wireless station to repeat the second hybrid beamforming training.

Example 87 includes the subject matter of any one of Examples 77-86, and optionally, wherein the beamforming scheme comprises a Multi-User (MU) Multiple-Input-Multiple-Output (MIMO) beamforming scheme.

Example 88 includes the subject matter of any one of Examples 77-87, and optionally, wherein the first wireless station is a User Equipment (UE).

Example 89 includes a method to be performed at a first wireless station, the method comprising during first hybrid beamforming training, simultaneously processing, via a plurality of Radio Frequency (RF) chains of the first wireless station, reception of one or more first spatially multiplexed Synchronization Signals (SS) from a second wireless station over a plurality of wide beam directions; selecting a reported wide beam direction of the plurality of wide beam directions, based on the one or more first SS; transmitting to the second wireless station a first feedback message to identify the reported wide beam direction; during a second hybrid beamforming training, simultaneously processing, via the plurality of RF chains of the first wireless station, reception of one or more second spatially multiplexed SS from the second wireless station over a plurality of narrow beam directions, which correspond to the reported wide beam direction; selecting a reported narrow beam direction of the plurality of narrow beam directions, based on the one or more second SS; and transmitting to the second wireless station a second feedback message to identify the reported narrow beam direction.

Example 90 includes the subject matter of Example 89, and optionally, comprising processing the first and second SS according to a Single-Carrier (SC) modulation scheme.

Example 91 includes the subject matter of Example 90, and optionally, comprising processing the first and second SS according to a spatial-frequency multiplexing scheme.

Example 92 includes the subject matter of Example 91, and optionally, wherein the spatial-frequency multiplexing scheme comprises an Interleaved Frequency Division Multiplexing (IFDM) scheme.

Example 93 includes the subject matter of Example 89, and optionally, comprising processing the first and second SS according to an Orthogonal Frequency Division Multiplexing (OFDM) scheme.

Example 94 includes the subject matter of any one of Examples 89-93, and optionally, comprising performing RF beamforming in the plurality of wide beam directions according to beamforming vectors defined according to a first codebook comprising a first plurality of code-words, selecting a second codebook based on the reported wide beam direction, and performing RF beamforming in the plurality of narrow beam directions according beamforming vectors defined according to a second plurality of code-words included in the second codebook.

Example 95 includes the subject matter of any one of Examples 89-94, and optionally, comprising digitally processing the simultaneous reception of the one or more first SS via the plurality of RF chains, and simultaneous reception of the one or more second SS via the plurality of RF chains.

Example 96 includes the subject matter of Example 95, and optionally, comprising digitally processing reception via the plurality of RF chains according to a Modular Antenna Array (MAA) architecture, which associates the plurality of RF chains with a respective plurality of different antenna element sets.

Example 97 includes the subject matter of Example 95, and optionally, comprising digitally processing reception via the plurality of RF chains according to a Fully Adaptive Antenna Array (FAA) architecture, which associates each RF chain of the plurality of RF chains with the same plurality of antenna elements.

Example 98 includes the subject matter of any one of Examples 89-97, and optionally, comprising repeating the second hybrid beamforming training.

Example 99 includes the subject matter of any one of Examples 89-98, and optionally, wherein the beamforming scheme comprises a Multi-User (MU) Multiple-Input-Multiple-Output (MIMO) beamforming scheme.

Example 100 includes the subject matter of any one of Examples 89-99, and optionally, wherein the first wireless station is a User Equipment (UE).

Example 101 includes a product comprising one or more tangible computer-readable non-transitory storage media comprising computer-executable instructions operable to, when executed by at least one computer processor, enable the at least one computer processor to implement operations at a first wireless station, the operations comprising during first hybrid beamforming training, simultaneously processing, via a plurality of Radio Frequency (RF) chains of the first wireless station, reception of one or more first spatially multiplexed Synchronization Signals (SS) from a second wireless station over a plurality of wide beam directions; selecting a reported wide beam direction of the plurality of wide beam directions, based on the one or more first SS; transmitting to the second wireless station a first feedback message to identify the reported wide beam direction; during a second hybrid beamforming training, simultaneously processing, via the plurality of RF chains of the first wireless station, reception of one or more second spatially multiplexed SS from the second wireless station over a plurality of narrow beam directions, which correspond to the reported wide beam direction; selecting a reported narrow beam direction of the plurality of narrow beam directions, based on the one or more second SS; and transmitting to the second wireless station a second feedback message to identify the reported narrow beam direction.

Example 102 includes the subject matter of Example 101, and optionally, wherein the operations comprise processing the first and second SS according to a Single-Carrier (SC) modulation scheme.

Example 103 includes the subject matter of Example 102, and optionally, wherein the operations comprise processing the first and second SS according to a spatial-frequency multiplexing scheme.

Example 104 includes the subject matter of Example 103, and optionally, wherein the spatial-frequency multiplexing scheme comprises an Interleaved Frequency Division Multiplexing (IFDM) scheme.

Example 105 includes the subject matter of Example 101, and optionally, wherein the operations comprise processing the first and second SS according to an Orthogonal Frequency Division Multiplexing (OFDM) scheme.

Example 106 includes the subject matter of any one of Examples 101-105, and optionally, wherein the operations comprise performing RF beamforming in the plurality of wide beam directions according to beamforming vectors defined according to a first codebook comprising a first plurality of code-words, selecting a second codebook based on the reported wide beam direction, and performing RF beamforming in the plurality of narrow beam directions according beamforming vectors defined according to a second plurality of code-words included in the second codebook.

Example 107 includes the subject matter of any one of Examples 101-106, and optionally, wherein the operations comprise digitally processing the simultaneous reception of the one or more first SS via the plurality of RF chains, and simultaneous reception of the one or more second SS via the plurality of RF chains.

Example 108 includes the subject matter of Example 107, and optionally, wherein the operations comprise digitally processing reception via the plurality of RF chains according to a Modular Antenna Array (MAA) architecture, which associates the plurality of RF chains with a respective plurality of different antenna element sets.

Example 109 includes the subject matter of Example 107, and optionally, wherein the operations comprise digitally processing reception via the plurality of RF chains according to a Fully Adaptive Antenna Array (FAA) architecture, which associates each RF chain of the plurality of RF chains with the same plurality of antenna elements.

Example 110 includes the subject matter of any one of Examples 101-109, and optionally, wherein the operations comprise repeating the second hybrid beamforming training.

Example 111 includes the subject matter of any one of Examples 101-110, and optionally, wherein the beamforming scheme comprises a Multi-User (MU) Multiple-Input-Multiple-Output (MIMO) beamforming scheme.

Example 112 includes the subject matter of any one of Examples 101-111, and optionally, wherein the first wireless station is a User Equipment (UE).

Example 113 includes an apparatus of wireless communication by a first wireless station, the apparatus comprising means for, during first hybrid beamforming training, simultaneously processing, via a plurality of Radio Frequency (RF) chains of the first wireless station, reception of one or more first spatially multiplexed Synchronization Signals (SS) from a second wireless station over a plurality of wide beam directions; means for selecting a reported wide beam direction of the plurality of wide beam directions, based on the one or more first SS; means for transmitting to the second wireless station a first feedback message to identify the reported wide beam direction; means for, during a second hybrid beamforming training, simultaneously processing, via the plurality of RF chains of the first wireless station, reception of one or more second spatially multiplexed SS from the second wireless station over a plurality of narrow beam directions, which correspond to the reported wide beam direction; means for selecting a reported narrow beam direction of the plurality of narrow beam directions, based on the one or more second SS; and means for transmitting to the second wireless station a second feedback message to identify the reported narrow beam direction.

Example 114 includes the subject matter of Example 113, and optionally, comprising means for processing the first and second SS according to a Single-Carrier (SC) modulation scheme.

Example 115 includes the subject matter of Example 114, and optionally, comprising means for processing the first and second SS according to a spatial-frequency multiplexing scheme.

Example 116 includes the subject matter of Example 115, and optionally, wherein the spatial-frequency multiplexing scheme comprises an Interleaved Frequency Division Multiplexing (IFDM) scheme.

Example 117 includes the subject matter of Example 113, and optionally, comprising means for processing the first and second SS according to an Orthogonal Frequency Division Multiplexing (OFDM) scheme.

Example 118 includes the subject matter of any one of Examples 113-117, and optionally, comprising means for performing RF beamforming in the plurality of wide beam directions according to beamforming vectors defined according to a first codebook comprising a first plurality of code-words, selecting a second codebook based on the reported wide beam direction, and performing RF beamforming in the plurality of narrow beam directions according beamforming vectors defined according to a second plurality of code-words included in the second codebook.

Example 119 includes the subject matter of any one of Examples 113-118, and optionally, comprising means for digitally processing the simultaneous reception of the one or more first SS via the plurality of RF chains, and simultaneous reception of the one or more second SS via the plurality of RF chains.

Example 120 includes the subject matter of Example 119, and optionally, comprising means for digitally processing reception via the plurality of RF chains according to a Modular Antenna Array (MAA) architecture, which associates the plurality of RF chains with a respective plurality of different antenna element sets.

Example 121 includes the subject matter of Example 119, and optionally, comprising means for digitally processing reception via the plurality of RF chains according to a Fully Adaptive Antenna Array (FAA) architecture, which associates each RF chain of the plurality of RF chains with the same plurality of antenna elements.

Example 122 includes the subject matter of any one of Examples 113-121, and optionally, comprising means for repeating the second hybrid beamforming training.

Example 123 includes the subject matter of any one of Examples 113-122, and optionally, wherein the beamforming scheme comprises a Multi-User (MU) Multiple-Input-Multiple-Output (MIMO) beamforming scheme.

Example 124 includes the subject matter of any one of Examples 113-123, and optionally, wherein the first wireless station is a User Equipment (UE).

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising a processor and one or more computer-readable non-transitory storage media comprising computer-executable instructions operable to, when executed by the least one processor, enable the at least one processor to cause a first wireless station to:
   during first hybrid beamforming training, simultaneously transmit, via a plurality of Radio Frequency (RF) chains of the first wireless station, a first plurality of spatially multiplexed Synchronization Signals (SS) beamformed in a plurality of wide beam directions, the first plurality of SS multiplexed in both space and frequency using digital baseband beamforming and RF beamforming;
   process a plurality of first feedback messages from a plurality of second wireless stations, respectively, to identify one or more reported wide beam directions of the plurality of wide beam directions;
   during a second hybrid beamforming training, simultaneously transmit, via the plurality of RF chains of the first wireless station, a second plurality of spatially multiplexed SS beamformed in a plurality of narrow beam directions, which correspond to the one or more reported wide beam directions, the second plurality of SS multiplexed in both space and frequency using the digital baseband beamforming and the RF beamforming;
   process a plurality of second feedback messages from the plurality of second wireless stations, respectively, to identify one or more reported narrow beam directions of the plurality of narrow beam directions; and
   transmit a Multi-User (MU) Multiple-Input-Multiple-Output (MEM) transmission to the plurality of second wireless stations according to a MU-MIMO beamforming scheme based on the reported narrow beam directions.

2. The apparatus of claim 1 configured to cause the first wireless station to modulate the first and second pluralities of SS according to a Single-Carrier (SC) modulation scheme.

3. The apparatus of claim 2 configured to cause the first wireless station to multiplex, according to a spatial-frequency multiplexing scheme, the first plurality of SS over the plurality of wide beam directions, and the second plurality of SS over the plurality of narrow beam directions.

4. The apparatus of claim 3, wherein the spatial-frequency multiplexing scheme comprises an Interleaved Frequency Division Multiplexing (IFDM) scheme.

5. The apparatus of claim 1 configured to cause the first wireless station to modulate the first and second pluralities of SS according to an Orthogonal Frequency Division Multiplexing (OFDM) scheme.

6. The apparatus of claim 1 configured to cause the first wireless station to perform the RF beamforming in the plurality of wide beam directions according to beamforming vectors defined according to a first codebook comprising a first plurality of code-words, to select a plurality of second codebooks based on the one or more reported wide beam directions, and to perform the RF beamforming in the plurality of narrow beam directions according beamforming vectors defined according to a second plurality of code-words included in the plurality of second codebooks.

7. The apparatus of claim 1 configured to cause the first wireless station to digitally process the simultaneous transmission of the first plurality of SS via the plurality of RF chains, and the simultaneous transmission of the second plurality of SS via the plurality of RF chains.

8. The apparatus of claim 7 configured to cause the first wireless station to digitally process transmission via the plurality of RF chains according to a Modular Antenna Array (MAA) architecture, which associates the plurality of RF chains with a respective plurality of different antenna element sets.

9. The apparatus of claim 7 configured to cause the first wireless station to digitally process transmission via the plurality of RF chains according to a Fully Adaptive Antenna Array (FAA) architecture, which associates each RF chain of the plurality of RF chains with the same plurality of antenna elements.

10. The apparatus of claim 1 configured to cause the first wireless station to repeat the second hybrid beamforming training to update the MU-MIMO beamforming scheme within the reported wide beam directions.

11. The apparatus of claim 1, wherein the first wireless station is a Base Station to communicate with one or more User Equipment (UE).

12. The apparatus of claim 1 comprising a digital processor, and the plurality of RF chains.

13. The apparatus of claim 1 comprising a memory and a plurality of antennas.

14. A product comprising one or more tangible computer-readable non-transitory storage media comprising computer-executable instructions operable to, when executed by at least one processor, enable the at least one processor to cause a first wireless station to:
  during first hybrid beamforming training, simultaneously transmit, via a plurality of Radio Frequency (RF) chains of the first wireless station, a first plurality of spatially multiplexed Synchronization Signals (SS) beamformed in a plurality of wide beam directions, the first plurality of SS multiplexed in both space and frequency using digital baseband beamforming and RF beamforming;
  process a plurality of first feedback messages from a plurality of second wireless stations, respectively, to identify one or more reported wide beam directions of the plurality of wide beam directions;
  during a second hybrid beamforming training, simultaneously transmit, via the plurality of RF chains of the first wireless station, a second plurality of spatially multiplexed SS beamformed in a plurality of narrow beam directions, which correspond to the one or more reported wide beam directions, the second plurality of SS multiplexed in both space and frequency using the digital baseband beamforming and the RF beamforming;
  process a plurality of second feedback messages from the plurality of second wireless stations, respectively, to identify one or more reported narrow beam directions of the plurality of narrow beam directions; and
  transmit a Multi-User (MU) Multiple-Input-Multiple-Output (MIMO) transmission to the plurality of second wireless stations according to a MU-MIMO beamforming scheme based on the reported narrow beam directions.

15. The product of claim 14, wherein the instructions, when executed, cause the first wireless station to modulate the first and second pluralities of SS according to a Single-Carrier (SC) modulation scheme.

16. The product of claim 14, wherein the instructions, when executed, cause the first wireless station to perform the RF beamforming in the plurality of wide beam directions according to beamforming vectors defined according to a first codebook comprising a first plurality of code-words, to select a plurality of second codebooks based on the one or more reported wide beam directions, and to perform the RF beamforming in the plurality of narrow beam directions according beamforming vectors defined according to a second plurality of code-words included in the plurality of second codebooks.

17. An apparatus comprising a processor and one or more computer-readable non-transitory storage media comprising computer-executable instructions operable to, when executed by the least one processor, enable the at least one processor to cause a first wireless station to:
  during first hybrid beamforming training, simultaneously process, via a plurality of Radio Frequency (RF) chains of the first wireless station, reception of one or more first spatially multiplexed Synchronization Signals (SS) from a second wireless station over a plurality of wide beam directions;
  select a reported wide beam direction of the plurality of wide beam directions, based on the one or more first SS;
  select a wide beam transmit direction based on the one or more first SS;
  transmit to the second wireless station a first feedback message via the wide beam transmit direction to identify the reported wide beam direction;
  during a second hybrid beamforming training, simultaneously process, via the plurality of RF chains of the first wireless station, reception of one or more second spatially multiplexed SS from the second wireless station over a plurality of narrow beam directions, which correspond to the reported wide beam direction;
  select a reported narrow beam direction of the plurality of narrow beam directions, based on the one or more second SS;
  select a narrow beam transmit direction within the wide beam transmit direction based on the one or more second SS; and
  transmit to the second wireless station a second feedback message via the narrow beam transmit direction to identify the reported narrow beam direction.

18. The apparatus of claim 17 configured to cause the first wireless station to process the first and second SS according to a Single-Carrier (SC) modulation scheme.

19. The apparatus of claim 18 configured to cause the first wireless station to process the first and second SS according to a spatial-frequency multiplexing scheme.

20. The apparatus of claim 19, wherein the spatial-frequency multiplexing scheme comprises an Interleaved Frequency Division Multiplexing (IFDM) scheme.

21. The apparatus of claim 17 configured to cause the first wireless station to perform RF beamforming in the plurality of wide beam directions according to beamforming vectors defined according to a first codebook comprising a first plurality of code-words, to select a second codebook based on the reported wide beam direction, and to perform RF beamforming in the plurality of narrow beam directions according beamforming vectors defined according to a second plurality of code-words included in the second codebook.

22. The apparatus of claim 17 comprising a memory and a plurality of antennas.

23. A product comprising one or more tangible computer-readable non-transitory storage media comprising computer-executable instructions operable to, when executed by at least one processor, enable the at least one processor to cause a first wireless station to:

during first hybrid beamforming training, simultaneously process, via a plurality of Radio Frequency (RF) chains of the first wireless station, reception of one or more first spatially multiplexed Synchronization Signals (SS) from a second wireless station over a plurality of wide beam directions;
   select a reported wide beam direction of the plurality of wide beam directions, based on the one or more first SS;
   select a wide beam transmit direction based on the one or more first SS;
   transmit to the second wireless station a first feedback message via the wide beam transmit direction to identify the reported wide beam direction;
   during a second hybrid beamforming training, simultaneously process, via the plurality of RF chains of the first wireless station, reception of one or more second spatially multiplexed SS from the second wireless station over a plurality of narrow beam directions, which correspond to the reported wide beam direction;
   select a reported narrow beam direction of the plurality of narrow beam directions, based on the one or more second SS;
   select a narrow beam transmit direction within the wide beam transmit direction based on the one or more second SS; and
   transmit to the second wireless station a second feedback message via the narrow beam transmit direction to identify the reported narrow beam direction.

24. The product of claim 23, wherein the instructions, when executed, cause the first wireless station to perform RF beamforming in the plurality of wide beam directions according to beamforming vectors defined according to a first codebook comprising a first plurality of code-words, to select a second codebook based on the reported wide beam direction, and to perform RF beamforming in the plurality of narrow beam directions according beamforming vectors defined according to a second plurality of code-words included in the second codebook.

* * * * *

UNITED STATES PATENT AND TRADEMARK OFFICE
CERTIFICATE OF CORRECTION

PATENT NO. : 10,122,434 B2
APPLICATION NO. : 15/199671
DATED : November 6, 2018
INVENTOR(S) : Roya Doostnejad et al.

Page 1 of 1

It is certified that error appears in the above-identified patent and that said Letters Patent is hereby corrected as shown below:

In the Claims

In Column 48, Line 35, in Claim 1, delete "(MEM)" and insert --(MIMO)--, therefor.

Signed and Sealed this
Twenty-ninth Day of January, 2019

Andrei Iancu
*Director of the United States Patent and Trademark Office*